US011555894B2

(12) United States Patent
Panas et al.

(10) Patent No.: US 11,555,894 B2
(45) Date of Patent: Jan. 17, 2023

(54) SYSTEM AND METHOD FOR ADAPTIVE OPTICAL TRACKING WITH SELECTABLE TRACKING MODES

(71) Applicants:Lawrence Livermore National Security, LLC, Livermore, CA (US); Government of the United States, as represented by the Secretary of the Air Force, Washington, DC (US)

(72) Inventors: Robert Matthew Panas, Dublin, CA (US); Phillip Harris Paul, San Francisco, CA (US); Harris J. Hall, Yellow Springs, OH (US); Lavern A. Starman, Dayton, OH (US)

(73) Assignees: Lawrence Livermore National Security, LLC, Livermore, CA (US); The Government of the United States, as represented by the Secretary of the Air Force, Wright-Patterson Air Force Base, OH (US)

( * ) Notice: Subject to any disclaimer, the term of this patent is extended or adjusted under 35 U.S.C. 154(b) by 352 days.

(21) Appl. No.: 16/817,256

(22) Filed: Mar. 12, 2020

(65) Prior Publication Data

US 2021/0286053 A1    Sep. 16, 2021

(51) Int. Cl.
*G01S 7/481* (2006.01)
*G01S 7/4863* (2020.01)
(Continued)

(52) U.S. Cl.
CPC .......... *G01S 7/4817* (2013.01); *G01S 7/4863* (2013.01); *G01S 7/4868* (2013.01); *G01S 17/89* (2013.01)

(58) Field of Classification Search
CPC .... G01S 7/4817; G01S 7/4863; G01S 7/4868; G01S 17/89; G01S 7/4816; G01S 17/66;
(Continued)

(56) References Cited

U.S. PATENT DOCUMENTS 8,587,686 B1 * 11/2013 Riza ................. G01S 17/89
348/222.1
2015/0042764 A1 * 2/2015 Xi ................. H04N 13/243
348/47

(Continued)

FOREIGN PATENT DOCUMENTS

| CN | 103326780 A | * | 9/2013 | |
| CN | 110389455 A | * | 10/2019 | |
| EP | 2126607 B1 | * | 1/2013 | ............. G01S 17/32 |

*Primary Examiner* — Jennifer D Bennett
*Assistant Examiner* — Erin R Garber
(74) *Attorney, Agent, or Firm* — Harness, Dickey & Pierce, P.L.C.

(57) ABSTRACT

The present disclosure relates to an adaptive, free-space optical system. The system may have a controller and a digital micromirror (DMM) array responsive to the controller. The digital micromirror may include a plurality of independently controllable micromirror elements forming a receiver for receiving optical signals from an environmental scene. At least two of the plurality of independently controllable micromirror elements are steerable in different directions to receive optical signals emanating from two or more locations within the environmental scene. A beam steering subsystem forms a portion of the micromirror array and is in communication with the controller for receiving control signals from the controller. A detector is used to receive an incoming free space optical signal imaged by at least one of the micromirror elements.

19 Claims, 11 Drawing Sheets

(51) Int. Cl.
*G01S 7/486* (2020.01)
*G01S 17/89* (2020.01)

(58) Field of Classification Search
CPC .. G02B 26/0833; G02B 26/10; G02B 26/105; G02B 27/30; G03F 7/70116; H01L 2924/1461; H04N 13/243; H04N 5/7458
See application file for complete search history.

(56) References Cited

U.S. PATENT DOCUMENTS

| | | | | |
|---|---|---|---|---|
| 2018/0191446 | A1* | 7/2018 | Blanks | G02B 27/4244 |
| 2018/0348344 | A1* | 12/2018 | Wyrwas | G01S 7/4816 |
| 2020/0278427 | A1* | 9/2020 | Chen | G01S 7/4972 |
| 2021/0263155 | A1* | 8/2021 | Miller | H01L 27/14643 |

* cited by examiner

Direction Identification from a Single Mirror/Pixel System
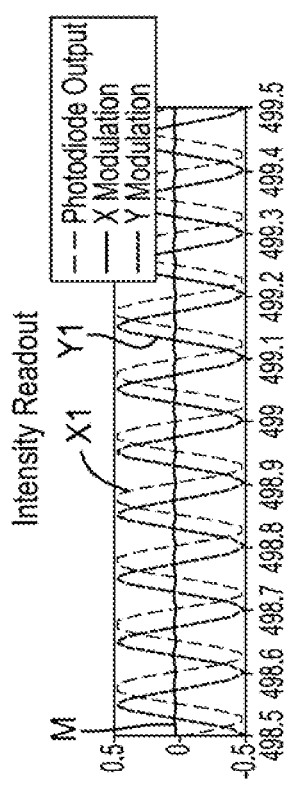
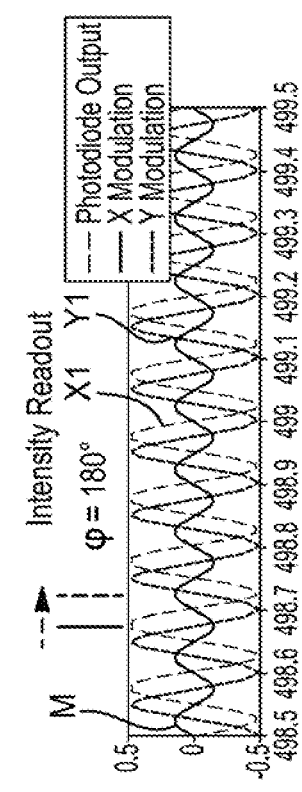
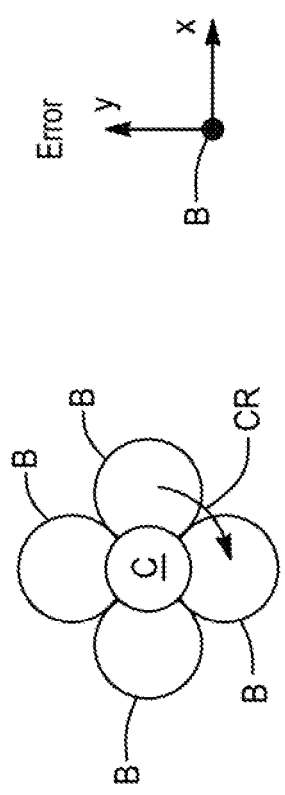
FIGURE 5a
Perfect Alignment
FIGURE 5b
FIGURE 5c
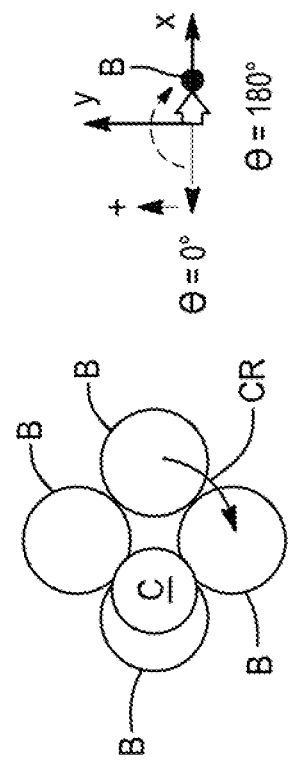
FIGURE 6a
Direction X Offset
FIGURE 6b
FIGURE 6c Direction Identification from a Single Mirror/Pixel System
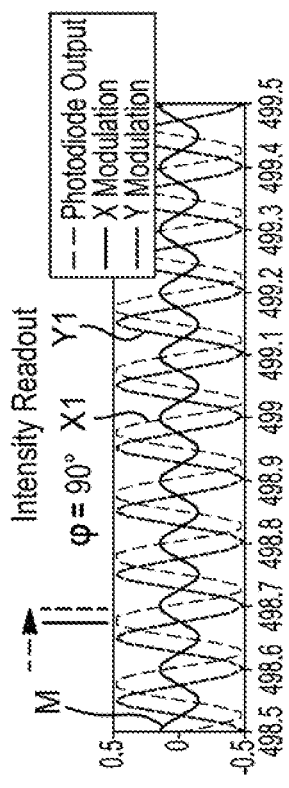
FIGURE 7a
Direction Y Offset
FIGURE 7b
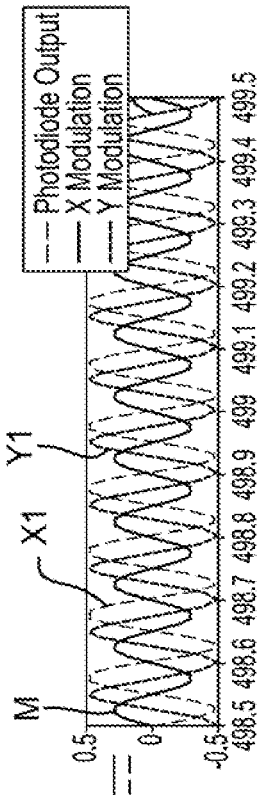
FIGURE 8a
Max Magnitude Error
FIGURE 8b
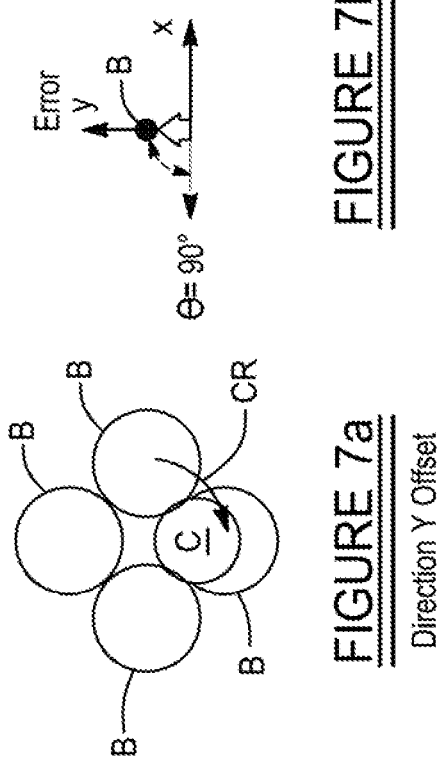
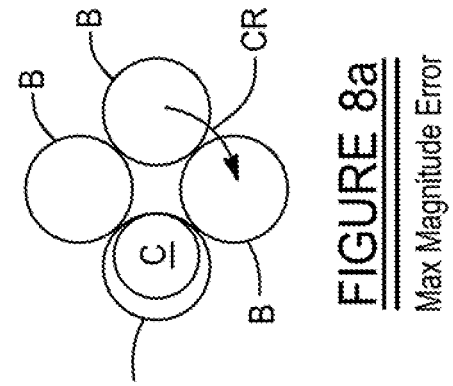
FIGURE 7c
FIGURE 8c

SYSTEM AND METHOD FOR ADAPTIVE OPTICAL TRACKING WITH SELECTABLE TRACKING MODES

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to adaptive optical tracking systems and methods, and more particularly to adaptive optical tracking systems and methods which are especially effective at more quickly carrying out optical scanning of a scene and analyzing the scene to identify specific objects for higher resolution tracking.

BACKGROUND

The statements in this section merely provide background information related to the present disclosure and may not constitute prior art.

Laser detecting and ranging systems ("Lidar" systems) are growing in popularity as new applications for their use present themselves. A Lidar system can provide an effective means to maintain awareness of nearby objects in a scene being imaged by the system.

One particularly challenging application lies with collision avoidance. In a collision avoidance application the nearby environment must be first scanned. Potential objects identified in the environment (scene) must then be interrogated by the system to determine if they are specific objects of concern. If they are so identified, then the objects of interest are tracked using further system resources. Thus the system moves through three distinct modes: acquisition, identification and tracking. Carrying out these three different modes places significant competing resource demands on the system, to the extent that conventional technologies have a difficult time supporting all three modes. For example, gimballed optics are excellent for identification and tracking in benign environments, but do poorly at scanning due to their slow motion response times. Micro-scanners tend to be much faster and scan well but often lack the large aperture or fine precision needed for initial identification of important objects in the scene and then closely focused tracking of specific, important objects.

Accordingly, further developments and improvements in optical tracking systems are needed to optimize carrying out the three distinct operations of initial low resolution scanning of a scene, identification of important object so interest, and more closely focused (e.g., higher resolution) tracking operations. There is a further need for the system to be able to carry out these important operations more quickly, more effectively, and with better power efficiency than previously developed optical scanning systems.

SUMMARY

This section provides a general summary of the disclosure, and is not a comprehensive disclosure of its full scope or all of its features.

In one aspect the present disclosure relates to an adaptive, free-space optical system. The system may comprise a controller and a digital micromirror (DMM) array responsive to the controller. The DMM array may include a plurality of independently controllable micromirror elements forming a receiver for receiving optical signals from an environmental scene; with at least two of the plurality of independently controllable micromirror elements being steerable in different directions to receive optical signals emanating from two or more locations within the environmental scene; and a beam steering subsystem and in communication with the controller for receiving control signals from the controller. The system may also include a detector for receiving an incoming free space optical signal imaged by at least one of the micromirror elements.

In another aspect the present disclosure relates to an adaptive, free-space optical system. The system may comprise an electronic controller and a digital micromirror (DMM) array responsive to commands from the electronic controller. The DMM array may include a plurality of independently controllable micromirror elements forming a receiver for receiving optical signals from an environmental scene; at least two of the plurality of independently controllable micromirror elements being steerable in different directions to receive optical signals emanating from two or more distinct locations within the environmental scene; and a beam steering subsystem forming an integrated circuit and responsive to the electronic controller, for implementing first and second different scanning modes commanded by the electronic controller simultaneously using different subpluralities of the micromirror elements. The system may further include a detector for receiving an incoming free space optical signal imaged by at least one of the micromirror elements.

In still another aspect the present disclosure relates to a method for imaging an environmental scene. The method may comprise providing a controller, and using a digital micromirror (DMM) array responsive to the controller to receive optical signals emanating from the environmental scene. The method may further include using a plurality of independently controllable micromirror elements of the digital micromirror array to receive the optical signals from the environmental scene. The method may further include further steering at least two of the plurality of independently controllable micromirror elements of the micromirror array in different directions to receive optical signals emanating from two or more locations within the environmental scene, and using a detector for receiving optical signals reflected by the at least two of the micromirror elements.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings. In the drawings:

FIGS. 5a-5c illustrate performance of the spinning lock operation in achieving directional identification of a remote CAFSOC system unit, when the detector of one CAFSOC system unit is locked on to the incoming pulse signal of a remote CAFSOC system unit during the spinning lock operation;

FIGS. 6a-6c illustrate a misalignment of the detector of a receiving CAFSOC system unit along the X-axis during the spinning lock operation;

FIGS. 7a-7c illustrate a misalignment of the detector of a receiving CAFSOC system unit along the Y-axis during the spinning lock operation;

FIGS. 8a-8c illustrate how a magnitude of Y axis misalignment is revealed at the photodiode output of the receiving CAFSOC system unit;

DETAILED DESCRIPTION

Example embodiments will now be described more fully with reference to the accompanying drawings.

The present disclosure is directed to new systems and methods for miniaturizing free space optical communications hardware, as well as significantly improving communications link robustness in dynamic conditions and challenging environments, as well as in inclement weather conditions. The systems and methods described herein draw on the use of high performance beam steering micromirror arrays to reduce system size and complexity while improving link reliability performance.

Figure 1:
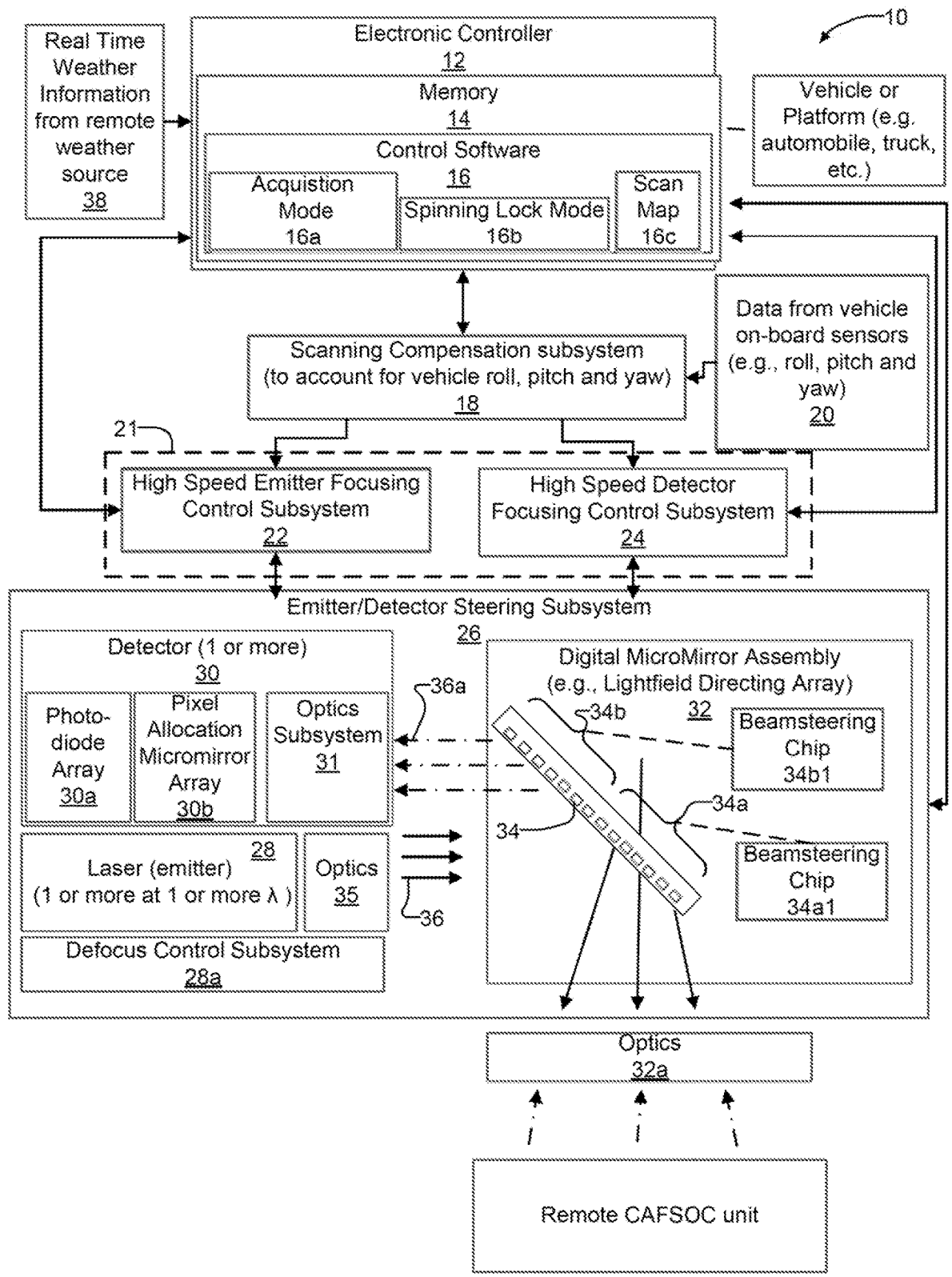
FIG. 1 is a high level block diagram of one embodiment of a compact adaptive free-space optical communications (CAFSOC) system in accordance with the present disclosure.
Figure 2:
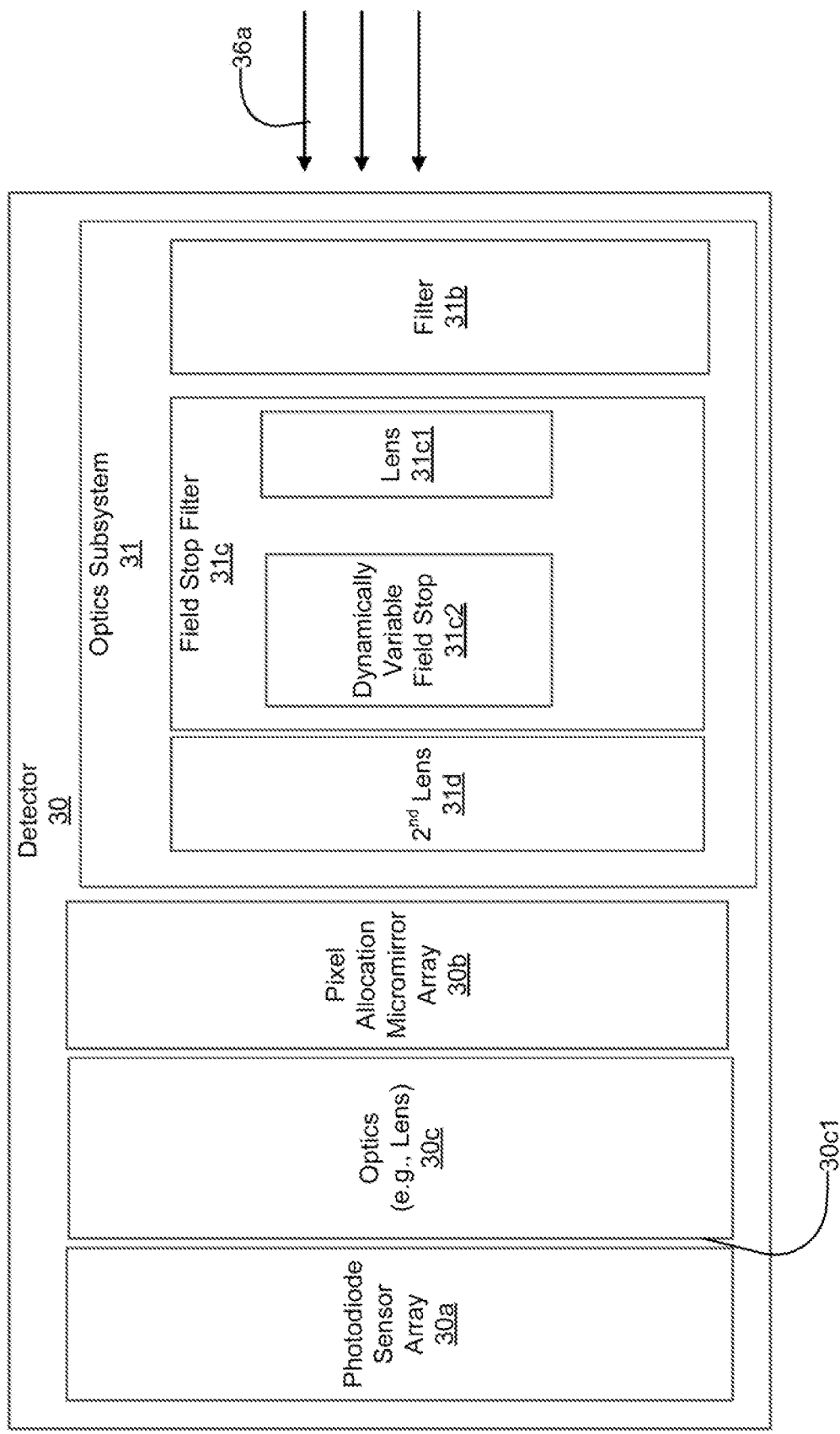
FIG. 2 is a high level block diagram of one example of a construction of the detector which may be used with the system.

Referring to FIG. 1, one embodiment of a low-cost, high reliability Compact Adaptive Free-Space Optical communications (CAFSOC) system 10 (herein after simply "CAFSOC system 10") is shown in FIG. 1 in accordance with one embodiment of the present disclosure. The CAFSOC system 10 is enabled by a Free-Space Optical Communications (FSOC) subsystem which makes use of advanced digital micromirror array beam steering chip technology, which is far more capable than conventional, present day digital micromirror devices (i.e., which need to be able to point over a range of values in along "tip" and "tilt" axes of the micromirror elements, unlike present day digital micromirror device (DMD) technology which can only stably point in two directions). The advanced, digital micromirror array beam steering chip technology may be formed by, for example, the Lightfield Directing Array ("LDA") developed by the assignee of the present disclosure, which employs closed loop feedback, and which is disclosed in U.S. Patent Pub. No. US 2018/0180872A1, published Jun. 28, 2018, the entire disclosure of which is hereby incorporated by reference into the present disclosure. While the FSOC subsystem could be enabled by any array beam steering chip technology with sufficient performance, the LDA is expected to be a highly preferred subsystem due to its present performance advantages. The beam steering technology provided by the LDA offers the potential to help form low cost CAFSOC communications links that can maintain signal lock even when operating in challenging operating/geographic/environmental conditions.

The CAFSOC system 10 offers a significant reduction in size, weight and power (SWaP) as it uses a smaller laser source and avoids the need for gimbal-mounted optics. The system 10 can also maintain tracking lock in the rough and adverse of conditions of turbulence, shock, acceleration, thermal variation, turbulence and vibration, as found on mobile platforms.

An agile precision pointing system like the CAFSOC system 10 offers a new route to break the conventional paradigm and achieve the best of both types of systems (directional and omnidirectional); consistent lock with low power and LPI/LPD performance while bypassing the typical size/cost limitation. The large angle range of the beam steering chip enables it to replace conventional steering mirrors and gimbal setups with an IC micro-fabricated mass production chip. This cuts out the majority of the size, cost and maintenance issues. The capability of the chip to move at extremely high speeds with closed loop control around integrated sensing allows the system 10 to manage the disturbances that would normally break lock and lose the link. Links can then be reliably set up over multiple kilometers in good weather conditions.

The CAFSOC technology employed with the CAFSOC system 10 is intended to maintain pinpoint tracking even in high-disturbance conditions which would break laser lock even on state-of-the-art systems, and furthermore to do so with far less beam jitter than previously developed beam pointing systems.

In FIG. 1 one CAFSOC system 10 "unit" is shown. It will be appreciated that the present disclosure preferably involves the use of two CAFSOC system 10 units. Each CAFSOC unit 10 includes a main system electronic controller 12 (hereinafter simply "controller" 12), having memory 14 included or accessible to it. The memory 14 may be a non-volatile memory such as, for example and without limitation, non-volatile RAM or ROM, and may contain control software 16 for helping to control aiming of a laser beam from the CAFSOC system as well as real time interpreting/detecting of objects within an imaged scene, and distances to such objects. The control software 16 includes a plurality of software submodules for implementing adaptive operating modes. A first such mode is a "Scanning Acquisition" mode 16a, which includes software which enables the CAFSOC system 10 unit to quickly initially detect and acquire a signal from another remotely located CAFSOC system unit. A second operating mode is a "Spinning Lock" mode 16b which includes software to enable the CAFSOC system 10 unit to perform a highly accurate, fine alignment operation to substantially perfectly lock on to a received signal from a remote CAFSOC system unit. These two operating modes will be described in greater detail in the following paragraphs. However, it will be appreciated that the present CAFSOC system 10 and method is not limited only to modes 16a and 16b, and that other modes, which may possibly include different combinations of modes 16a and 16b with other modes, are within the scope of the present disclosure.

The controller 12 may receive information from a scanning compensation subsystem 18 to account for platform movement, such as elevational position changes of the vehicle, roll, pitch, yaw, etc. The scanning compensation subsystem 18 generates the information from raw data received from vehicle on-board sensors 20 (e.g., gyroscope(s), roll sensor, pitch sensor, yaw sensor, etc.). Any sensing gaps (e.g., lack of gyros in a vehicle) in the vehicle on-board sensors can be supplemented with sensors included in the CAFSOC system. And while the CAFSOC system 10 is expected to find particular utility in connection with highly mobile platforms like cars or personnel, CAFSOC system 10 is also usable with a wide variety of other types of vehicles, for example marine vessels, aircraft, remotely controlled drones, and even earth moving equipment, off road vehicles (ATVs), and even railway vehicles (e.g., trains). The scanning compensation subsystem 18 communicates scanning compensation data to a high speed focusing control subsystem 21 which may include a high speed emitter focusing control subsystem 22 (hereinafter simply "emitter focusing subsystem" 22), as well as a high speed detector focusing electronic control subsystem 24 (hereinafter simply "detector focusing subsystem" 24). The emitter focusing subsystem 22 generates control signals. Emitter focusing subsystem 22 and detector focusing subsystem both communicate bidirectionally with an emitter/detector steering subsystem 26, which generates one or more laser beams out to neighboring CAFSOC system 10 units and receives back optical signals from one or more CAFSOC system units in the area.

The emitter/detector steering subsystem 26 may include one or more lasers 28 and a detector 30 having a photodiode array 30a comprised of one or more light sensors, which in this example are in the form of photodiodes. For convenience, the laser 28 will be described as generating a single laser beam, although the present disclosure may just as readily be used with a plurality of independently controllable lasers that generate a corresponding plurality of laser beams. If a plurality of independently lasers are used, the beams may be of a common wavelength, or different wavelengths, each possibly selected based on providing optimal transmission through particular kinds of weather or environment.

The emitter/detector steering subsystem 26 may also include an optics subsystem 31, and a digital micromirror assembly 32. The digital micromirror assembly 32 may have a plurality of independently, digitally controllable micromirrors 34 which can be used to reflect the entire laser beam 36 generated by the laser 28. The laser beam 36 emitted from the digital micromirror assembly 32 passes through an optics subsystem 35 prior to reaching the micromirrors 34, through an optics subsystem 32a toward a scene being viewed. A dynamically variable field stop 30d is also preferably incorporated in the detector 30.

The digital micromirror assembly 32 also operates to reflect received light signals back to the detector 30 through the optics subsystem 31. In this regard, it will be appreciated that one group of the micromirrors 34, for example indicated by reference number 34a, functions as an "emitter array" to control the direction of emitted light from the laser 28 toward the scene being imaged laser, while a different group of the micromirrors 34, for example designated by reference number 34b, may function as a "detector array", which may be used to reflect received light signals into the detector 30. The digital micromirror assembly 32 also importantly includes a first beam steering chip 34a1 for controlling the positioning of each of the micromirrors in the emitter array 34a, while a second beam steering chip 34b1 may be used to control the micromirrors 34 in the detector array 34b. In another embodiment, a single beam steering chip may be used to control the micromirrors in both the emitter array 34a and the detector array 34b. Both implementations are contemplated by the present disclosure.

In one implementation the digital micromirror assembly 32 uses individual ones of the micromirrors 34 or subgroups of the micromirrors 34 to reflect different portions of the laser beam 36 (or even separate laser beams if more than two lasers are being used) toward two or more specific remote CAFSOC system units in the scene, and to reflect received optical signals 36a from the two or more CAFSOC system units back into the detector 30. The digital micromirror assembly 32 thus makes it possible to closely track two or more objects within a given scene simultaneously in real time.

The digital micromirror assembly 32 also collects reflected optical energy back from the scene being imaged, or from specific subregions or objects within the scene, and provides data corresponding to the received optical signal to the detector 30. Again, the detector 30 may be a single light detector or an array of independent light detectors, with one embodiment shown in FIG. 1 having the photodiode array 30a. The emitter/detector subsystem 26 reports the collected data back to the controller 12 which uses the control software 16 to quickly acquire signals from one or more other CAFSOC system units and to fine tune the DMM assembly 32 to substantially perfectly lock on to the received signal.

One possible configuration of the arrays 34a and 34b of the digital micromirror assembly 32 is rather to use a single array for both emission and detection steering, so they are using a common window. This requires a means to separate the returning light from the emitted light, which is done generally in one of two ways. In the first way, the apertures are of significantly different size, so one can form a small part of another while being co-aligned. For example, the laser beam 36 is reflected off a small mirror at the center of the collection aperture. Unfortunately, for MEMS, the aperture size is the major cost factor, and the performance scales by the product of the two apertures, emitter and receiver. So mismatching the size reduces performance while increasing cost. Matching the aperture sizes generally provides the highest return signal capture for the lowest cost. In the second way, a beamsplitting optic is used to partially reflect some of the return beam to the detector. The ideal beamsplitting value is generally roughly 50:50 splitting. Unfortunately, this attenuates the outgoing signal and the return signal, meaning approximately 4× the power is required. The increased power directly raises the cost of the emitter. From a practical view, the stray light from putting both onto a common array and having both go through a common window causes significant technical challenges. This is because even the fractional stray light returns from the shared optical path are often enough to swamp the detector reading, since it can be around six orders of magnitude lower than the emitted pulse. There will be windows, one on the mirror chip and one on the housing, and the external faces of the housing window will never be free of scattering objects. A separate window and optical path for emission vs detection avoids this signal cross-talk and lowers emitter power demands and sensor performance demands. The shared window can be implemented but another system using separated arrays/windows will win on cost hence margin, simplicity, manufacturability and performance. So while the present CAFSOC system 10 may operate with a common array and window, one preferred layout is with separate arrays and windows.

The emitter and detection arrays 34a and 34b may have additional optical elements (31, 35, 32a) including lenses, angle magnification elements and area magnification elements placed before or after them. It is generally best practice to use a similar set of optics for both arrays, so they have matched optical capabilities (angular range, etc.) in order to do parallel tracking. For instance, angle magnifying lenses may be placed in front of both (32a) to increase the angular throw of the CAFSOC system 10. This has the effect of increasing resolution and beam size on target, but the tradeoff may be worth it in many cases.

The CAFSOC system 10 provides the advantage that the light detecting sensor 30 may be operated in an adaptive mode by using different ones of the micromirrors 34 of emitter array 34a to control steering of the beam(s) from the laser beam 36 as well as to selectively direct different ones of the received (i.e., reflected) light signals back into the detector 30. In general, it would be desirable to match the array size of the micromirrors 34 used with the detector array 34b to the array size of the micromirrors 34 used with the emitter array 34a to emit the laser beam 36, so as to have a 1:1 mapping for laser 28 (i.e., the emitter) and the detector 30, but this is not strictly required. For example, the detector array 34b could be made larger than the emitter array 34a to capture more return light. The detector array 34b, or just a portion thereof, may then be steered to capture returns from any given area in the field-of-view, or possibly two or more given areas simultaneously. Splitting the receiver would allow for the CAFSOC system 10 to maintain communication lines with more than one other CAFSOC system node simultaneously. Both the emitter and receiver could be split to maintain transmit and receive capabilities out to two or more other CAFSOC system units. The ability to focus a part (or the whole of) the receiver array on a single spot will significantly reduce noise by rejecting light from all other directions but the small targeted field of view for each sensor of the detector 30. The detector 30 adaptively maps the incoming light 36a to a plurality of photodiodes within it by the use of a pixel allocation digital micromirror array 30b inside the detector 30. This process is described below. The detector array 34b could be slaved so that the detector array 34b effectively "tracks" the emitter array 34a once locked on to another CAFSOC system 10 unit, producing an optical imaging system that is both emitting to a particular direction and only sensing in that particular direction. The benefit of this configuration is significantly reducing interference in the detector 30, thus significantly improving the signal-to-noise ratio. If higher sensing capability is desired for a particular beam, multiple detector array 34b micromirror elements could be pointed at the same angle to proportionally increase the captured signal. Likely, leaving each detector array 34b micromirror 34 steering element slaved to a corresponding emitter array 34a micromirror element will still provide good performance, as the increase in signal would also be generally accompanied by pointing more of the emitter array 34a micromirror elements 34 at the point of interest too. In general, the detector micromirror array 34b and the emitter micromirror array 34a act to bring a particular area of the field-of-view into regard by the CAFSOC system 10, similar to a laser telescope and sensor telescope working in parallel to focus on another CAFSOC system 10 unit. By approximately slaving the detector 34b and emitter 34a micromirror arrays together, the CAFSOC system 10 is able to maximize the signal-to-noise ratio even if the beam is split and communication is parallelized by using multiple separate output beams. This is because the signal-to-noise is approximately driven by the product of the emitter area and the detector area, so the highest product for the least number of mirrors is to have the two aperture sizes equal. The acceptance angle of each detector array 34b micromirror element 34 could be made slightly wider than the expected emitter beam (i.e., beam 36) size so as to still capture the full emitted laser beam signal, even if the emitter array 34a and detector array 34b are slightly misaligned. This acceptance angle parameter would be largely constrained by the design of the detector 30, described below. However, the tradeoff is that the larger this acceptance angle is, the higher the background noise is likely to be.

Figure 3:
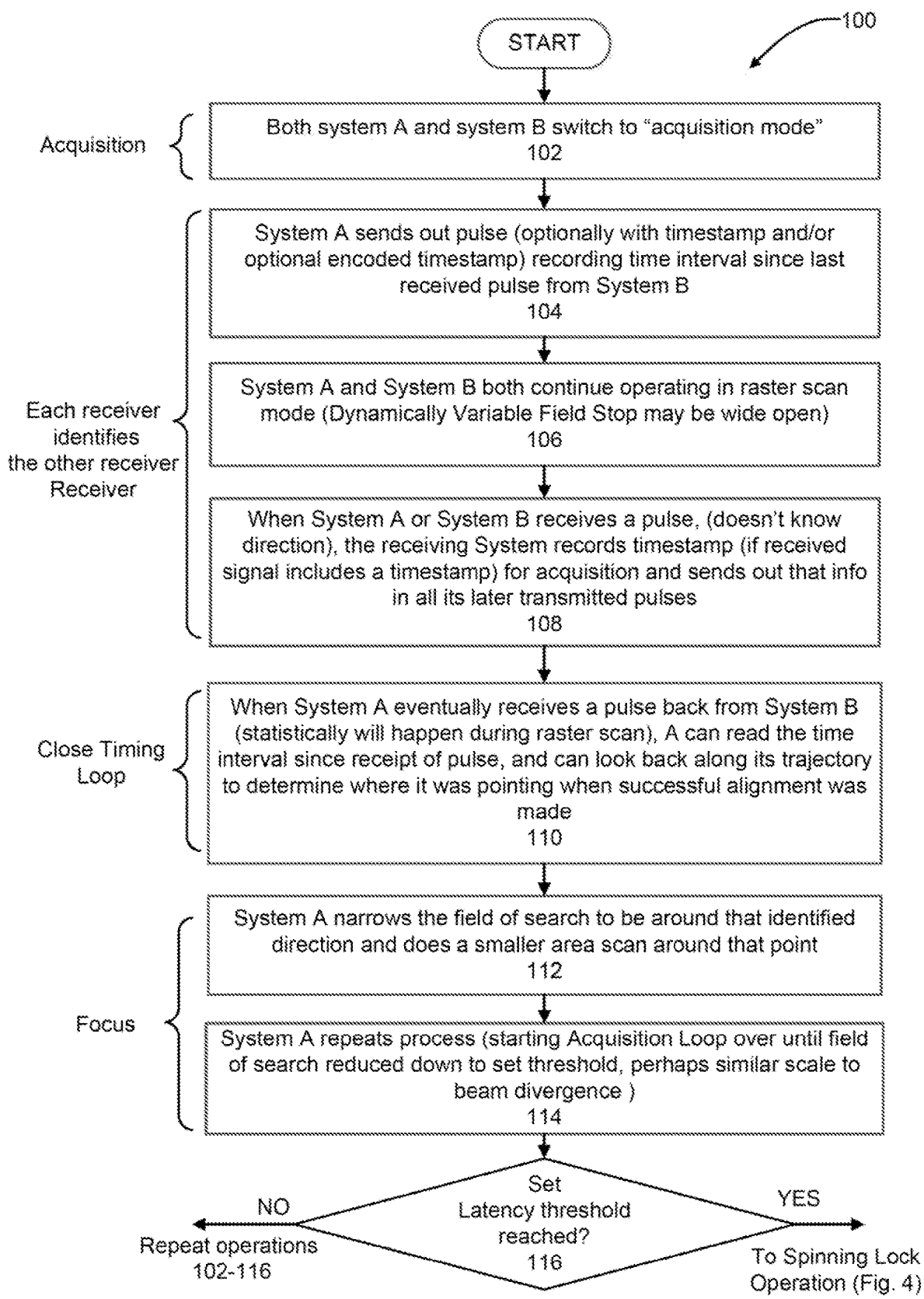
FIG. 3 is a flow chart illustrating one operational sequence that the system may be used to initially acquire a communications link with another remote CAFSOC system.

The detector 30 maps the light captured by the detector micromirror array 34b to the photodiodes of the photodiode sensor array 30a within it. It is often desired to use a small photodiode with the highest possible signal on it to improve signal collection capability. This requires that all light 36a being received from a specific communication pulse be focused down to a single area that may be smaller than the size of the steering mirrors in the digital detector micromirror array 34b. The size of the diode controls noise for some types of diodes (PIN), and the detector 30 response time, which is important for observing short nanosecond scale pulses characteristic of communications returns. Each independent beam sent out by the CAFSOC system 10 unit emitter/detector steering subsystem 26 will generally also have a return beam from the communications unit (i.e., the other CAFSOC system 10 unit) at the other end, which will be captured by the corresponding slaved section of the detector micromirror array 34b, and all the return signal associated with that pulse should be focused to a single photodiode pixel (i.e., one of the photodiodes in the photodiode sensor array 30a in FIG. 1) if possible to minimize noise. However, minimizing noise presents two difficulties. First, the distribution of the detector micromirror array 34b area is adapting rapidly to capture the returns from one or more emitted beams so it cannot be predetermined. The layout of the light directing systems 31 and 30b within the detector 30 to focus the incoming light 36a to the photodiodes 30a must then also be adaptive. Second, there is an issue of environmental background noise including stray light from other nearby communications units pulled in by the sensors, or unwanted efforts to blind the sensor (i.e., photodiode). It is desired that the detector sensors (i.e. photodiodes of the photodiode sensor array 30a) only receive light from each micromirror element 34 in the detector array 34b corresponding to the direction of interest that the mirror element is pointing. However, mirrors will also pass light into the system from all other angles, which can get read in to the photodiodes 30a of the photodiode sensor array 30a causing environmental noise, if not filtered out. This is a particular issue with solar reflection or sensor crosstalk if other communications units are operational in the area, as would be expected for nearby nodes in a network. The desired incoming communication light is all leaving the emitter/detector steering subsystem 26 detector micromirror array 34b as a parallel set of beams 36a, while the unwanted light will be reflected off the mirrors at non-zero angles corresponding to other locations in the field of view. There is therefore a need to filter this off-axis light for both the wavelengths of interest and to remove the unwanted environmental noise returns. The design in FIG. 3 shows one way both of these goals may be accomplished. The signal 36a from the digital micromirror assembly 32 is fed into the detector 30. First, the light is filtered by a filter 31b to reduce returns corresponding to wavelengths other than the wavelengths used by the CAFSOC system 10. Second, a standard field stop filter 31c is used to block the angular component of the captured light. This can work by using a lens 31c1 to focus the light to an image plane. A dynamically variable field stop (i.e., blocking filter with controllable sizable aperture) 31c2 is placed on the image plane, and controlled by the control software 16, to controllably vary the area through which light may be received. All light leaving the detector micromirror array 34b at undesired angles will get mapped to other locations on the focal plane, and be blocked by the dynamically variable field stop 31c2. A second lens 31d returns the light back to a roughly collimated beam, which is pointed at the internal pixel allocation micromirror array 30b. The lenses may additionally be used in a standard image transfer setup where the detector micromirror array 34b is considered the input image plane. The lenses would then pass the image through the dynamically variable field stop 31c2 and reimage it to the pixel allocation micromirror array 30b. This is often done with a 4-f optical setup, which does not magnify the image. While the pixel allocation micromirror array 30b does not need to be the same array size as the detector micromirror array 34b, it is generally best practice and the most flexible layout to make them equal. Then each mirror on the detector micromirror array 34b is mapped to a mirror on the pixel allocation micromirror array 30b. The pixel allocation micromirror array 30b takes the collimated light incident on it and distributes that light to the array of photodiodes of the photodiode sensor array 30a, which record the light pulse. The distribution process is carried out by steering the light through a lens 30c which maps angle to displacement of the focal point on the image plane. In this example the detector sensor array 34b is located on the image plane 30c1 of the lens 30c, so as the mirrors on the pixel allocation micromirror array 30b change the emitted angle of the light, that light focuses down to a different spot on the photodiode sensor array 30a. The benefit of using the lens 30c is that the focal point on the photodiode sensor array 30a is much smaller than the beam size at the pixel allocation micromirror array 30b. This allows for smaller detector sensor pixels to be used, which reduces sensing noise and reduces sensor response time. Each emitted beam 36 will generally have one pixel used to capture the return pulse 36a to minimize noise, so the photodiode array 30a is sized largely by the expected degree of parallelization. It is expected that a small array of <10 photodiodes will be generally sufficient.

Figure 4A:
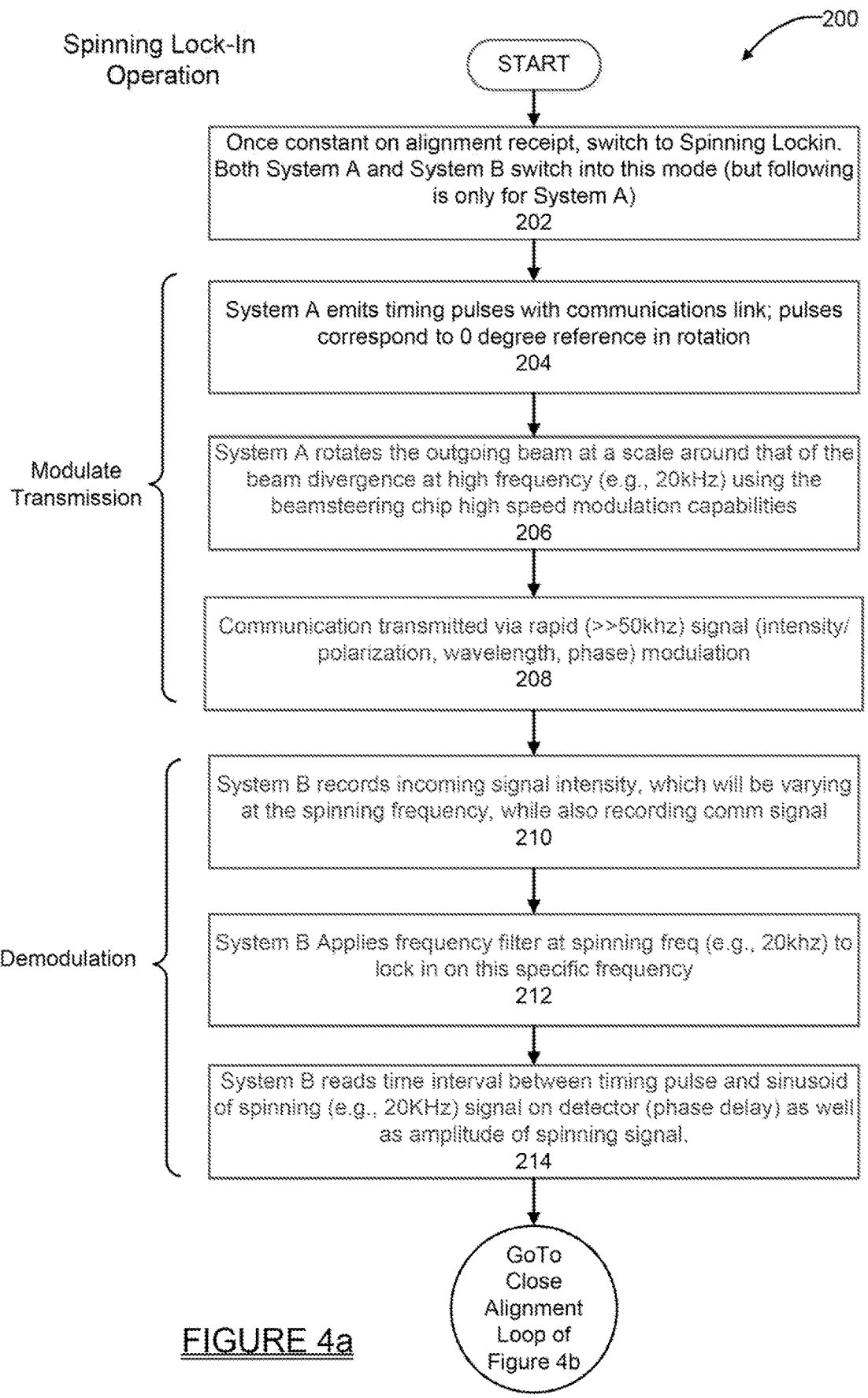
FIGS. 4a and 4b show flowcharts of operations performed by two CAFSOC system units in modulating and demodulating transmissions to initially acquire, lock on, close and focus signals being exchanged between the two CAFSOC units.

Referring to FIGS. 3, 4 and 4a, one example of the operational sequence of using the CAFSOC system 10 is shown. Referring initially to FIG. 3, just before entering the acquisition mode, both of Systems A and B will be pointing at specific locations (i.e., along specific vectors) while looking broadly. At operation 102 System A and System B both switch into the acquisition mode which is implemented using the acquisition mode software 16a. The acquisition mode is intended to robustly bring two CAFSOC system 10 units into direct alignment, even in dynamic conditions (e.g., where one or both are moving or other environmental conditions are rapidly changing). For the purpose of describing the operations being performed in FIGS. 3 and 4, one CAFSOC system 10 unit will be referred to simply as "System A" and the other will be referred to simply as "System B".

At operation 104 System A sends out an optical pulse (i.e., a "ping") optionally with a timestamp recording time (which may optionally also be encoded) since the last received pulse from System B. If System A has not received a pulse from System B yet, then no timestamp is included. As this operation is repeated by System A, it records the vector that the transmitter signal was sent along using its scan map 16c. At operation 106, System A and System B both continue operating in a raster scan mode, in other words in a back-and-forth scanning pattern looking for a pulse from the other. When System A or System B detects a pulse (the specific originating vector being unknown), the receiver of the receiving System records the time of acquisition, and now sends out a timestamp corresponding to the amount of time that has passed since the time of acquisition. That timestamp is sent out in all of its later transmitted pulses, as indicated at operation 108. When System A eventually receives a pulse back from System B (statistically this will happen eventually during raster scanning by System A's receiver), System A can read the time interval since System B received a pulse from System A, and System A can look back along its trajectory using its scan map 16c to determine exactly where it was pointing (i.e., the pointing vector) when successful alignment was made, as indicated at operation 110. At operation 112, System A then narrows the field of search to be around that previously identified direction and does a smaller area scan around that that specific point (i.e., around that specific vector associated with the transmitted pulse that produced a response from System B). By "smaller scan area", System A may zoom in by a factor of, for example 2-10, to create a significantly smaller field of view. The scan continues widening up from the specified point until a return signal is received noting a new contact made with System B. At operation 114, Systems A and B both repeat the above operations 104-112 until the field of search is reduced to a set threshold, perhaps similar in scale to the beam divergence.

Systems A and B, which are both performing the above-described operations during the acquisition mode, will iterate to proximate alignment quickly (e.g., typically within about 0.1 seconds). The time interval between receipt of pulses by each of Subsystem A and Subsystem B will drop rapidly as alignment is achieved. During acquisition, System A needs to be able to look and emit light over a wide field of view to be ready to record the incoming signal from System B and time stamp it. There are several methods that could be employed to even further aid in improving the field of view of the receiver (detector) 30 of each of System A and System B, and these could be done individually or together. First the detector 30 of each of System A and System B could use a fish eye lens type setup in the optics 32a that can capture light from a wide range of directions. Second, System A (or more preferably both System A and System B) could modulate the dynamically variable field stop 31c2 in its detector 30 in order to widen the field of view for each of the sensors 30a. Third, the beam steering chip 34b1 could be commanded to have each of its associated elements 34 point in a different direction, meaning the beam steering chip would essentially act as a convex mirror to provide a wide field of view. Fourth, one of the sensors 30a could be a camera chip, which could be used during the defocused operation to provide an estimate of the location of the emitter (i.e., System B), as compared to a single pixel 34 which cannot provide any location information. The net effect of all of these would be to widen the field of view of capture so the transmission from each of System B and System A can be received by the other regardless of their locations. Once the location of System B is known by System A via the acquisition process aligning to a specific orientation, the receiver (detector) 30 of System A can switch from a wide field of view mode to a narrow field of view around that just-identified direction, as indicated at operation 112, to lock-in by using the alignment information provided by the emitter array 34*a*. This will shift the link to a more robust, jam-resistant mode. The use of a camera chip as one element of the detector sensor array 30*a* allows the receiver (detector 30) to begin focusing in on the source point before the emitter focusing control subsystem 22 is locked in fully. At operation 116 System A makes a check if the field of search has been narrowed down to returns occurring at a predetermined set narrow time latency threshold, for example a few milliseconds. The predetermined narrow threshold before getting a return signal may also be an angle, for example, the beam scan (working in a spiral pattern from the point of last alignment) reaches an angle scale equal to the divergence of the received beam. A check is then made at operation 116 to determine if the predetermined, set latency threshold has been reached, and if not, then operations 102-116 are repeated. If the check at operation 116 indicates that the predetermined latency threshold has been reached, then the spinning lock control routine may be executed. Again, it will be appreciated that with System B preferably performing operations 110-114 as well, the iteratively process is significantly improved; essentially Systems A and B working together can cut the time needed to reach the latency threshold by 50% or more.

The spinning lock operation is set forth in flowchart 200 of FIG. 4. Initially at operation 202, both of Systems A and B switch into this mode of operation, although certain ones of the operations set forth in FIG. 4 reference just System A, it will be appreciated that System B is performing the same operation. In effect System B is substantially simultaneously performing the same operations.

At operation 204 System A emits timing pulses with a transmitted communications link. The transmitted beam is modulated to spin in a small circle whose angular radius is on the scale of the beam divergence. From the perspective of the emitter, the beam modulation is a slight circle around a particular angle. The emitter choses an arbitrary orientation in the modulation to be the reference angle, at which point the modulation rotation angle may perhaps be set to 0. A timing pulse is sent out when the beam is at that reference angle. The timing pulses may correspond to 0 degree reference in rotation. At operation 206 System A directs the emitted beam in a circular pattern, whose angular radius is small enough that the beam is consistently overlapping the centerpoint of the circle. This is shown in FIG. 5*a*, where all of beams "B" have a small portion which equally, uniformly overlaps a center aim point "C" representing a single pixel of the detector 30, and wherein the center aim point in this example represents the exact vector along which a remote system CAFSOC system unit is transmitting its pulsed optical signal. The rotational frequency of the beam B may be a few kilohertz, but in a preferred implementation is about 20 KHz.

FIG. 5*b* shows the resulting scan area covered by the beams B centered over the intersection of the X and Y axes indicating no X or Y axis error. Thus, the circle formed by movement of the beams B is perfectly aligned along the vector from which the received pulsed optical signal is originating from. The graph of FIG. 5*c* shows the modulation intensity "M" of the output of a single photodiode (i.e., single pixel) of the detector 30, which is generally constant during this condition of perfect alignment. Waveforms X1 and Y1 in FIG. 5*c* show the positional modulation scale of the emitted signal from System A, which is constant while scanning the beam B1 in a circular pattern around the center aim point C. This circular scanning of the beam B in FIGS. 5*a*-8*a* is accomplished using the high speed modulation capabilities of the emitter beam steering chip 34*a*1. In this example arrow "CR" indicates a clockwise rotation of the beam B in a circular pattern, although the rotation could just as easily be counter-clockwise.

With brief reference to FIGS. 6*a*-6*c*, FIG. 6*a* illustrates the shifting of the beam B occurring when there is an error along the X axis. The intensity M of the photodiode output in FIG. 6*c* indicates that the intensity of the received signal is varying significantly in a sinusoidal pattern as the beam B is scanned in a circular motion, due to the X-axis misalignment of the circularly scanned beam B. FIGS. 7*a*-7*c* illustrate the same type of error but only along the Y axis. Again, the modulation intensity M in FIG. 7*c* is varying in a sinusoidal pattern, but shifted 90" due to the Y-axis misalignment of the circularly scanned beam B. FIGS. 8*a*-8*c* illustrate a maximum degree of modulation intensity change as the error is along the X axis, and the scanned beam B fully overlaps the center aim point C. The phase shift of the modulated signal M (either leading or lagging waveforms X1 and Y1), as well as the magnitude and sign (positive or negative) of the detected signal, enables System A (and System B as well) to determine both the directional pointing vector error, as well as a magnitude error. This is a direct measure of the positional error in beam alignment to the detector 30. By feeding back the vector error along the communication channel, System B can pass System A everything System A needs to bring the emitted laser back into alignment with System B's detector. These two important features enable each of Systems A and B to quickly "home in" on a precise directional alignment vector of the other.

Returning to FIG. 4*a*, at operation 208 the communication from System A is transmitted via rapid (e.g., >>20 KHz) signal (modulated by one of intensity, wavelength or phase). At operation 210 System B records the incoming signal intensity, which will be varying at the spinning frequency, while also recording the communications signal (i.e., information contained in the received signal provided by System B). At operation 212, System B applies a frequency filter (e.g., performed in signal processing software) to the signal received off the detector sensor array 30*a* at a spinning frequency (e.g., 20 KHz) to lock on to this specific frequency. At operation 214, System B reads the time interval between timing pulse and sinusoid of the 20 KHz spinning signal on its detector 30 (i.e., phase delay). As explained above, the power modulation occurring due to the spinning lock operation when carried out by both units provides both System A and System B the information needed so that each maintains lock-on to the other.

Figure 4B:
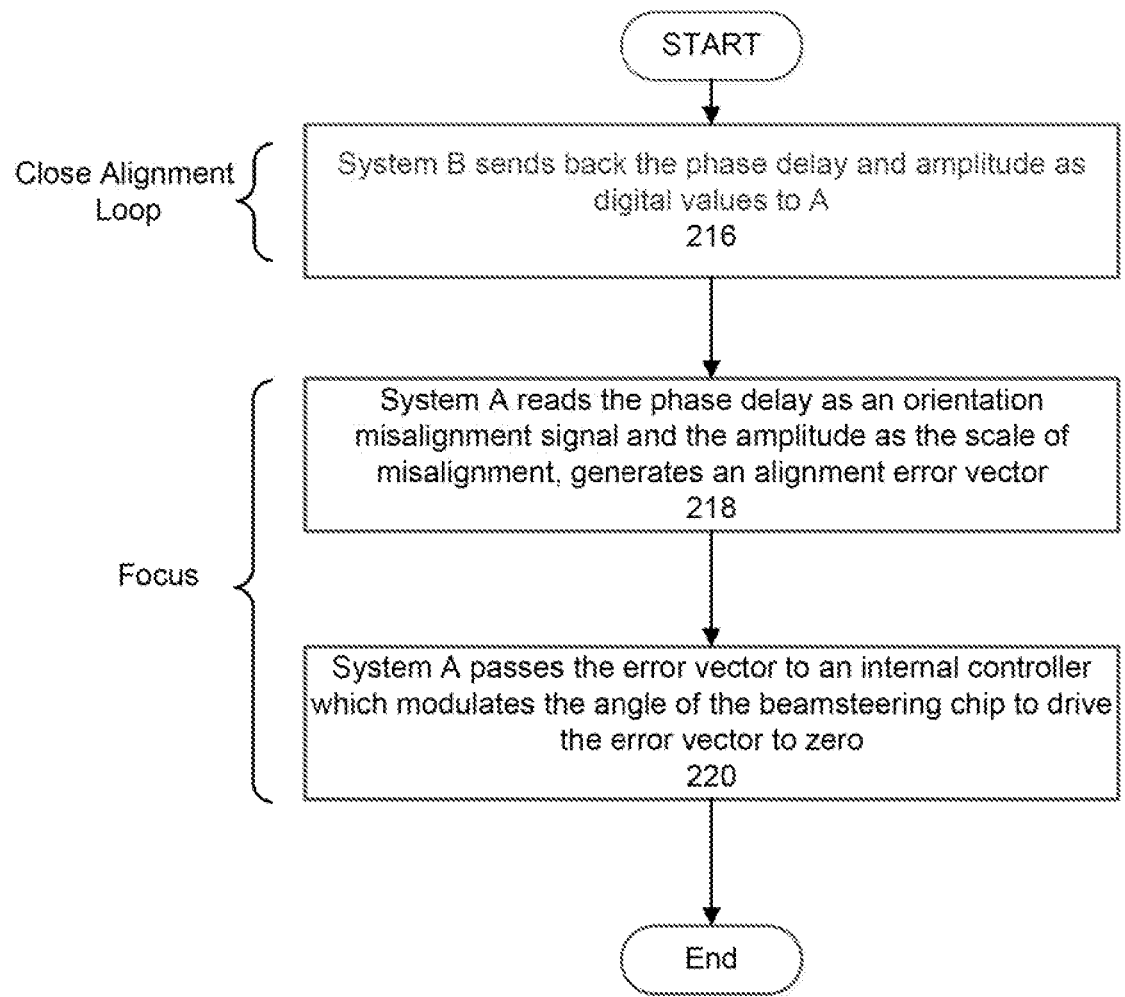

Referring to FIG. 4*b*, the close alignment loop operation may then be performed at operation 216. Operation 216 involves having System B send back the phase delay and amplitude as digital values to System A. This operation is done digitally, meaning the signal does not degrade with separation r. This compares favorably against standard techniques that call for an analog reflection to return to the emitter which degrades by $1/r^2$. Digitization avoids the standard communication challenges of the $1/r^4$ drop off where the emitted signal drops by $1/r^2$ in reaching the target, then by $1/r^2$ in returning. This means that the laser power requirements for loop closure are significantly reduced.

With both the transmitter and receiver maintaining a spinning lock on each other, the link between the systems becomes highly resilient to orientation error signals with frequencies well below the spinning frequency (around 20 kHz), such as like platform motion, vibration, shock, etc. Motion in System A's platform will have a significantly more negative effect on System A's ability to point at B rather than vice versa due to the separation distance amplifying small platform angular variations into large positional errors. Sensor B's spinning lock on likely will not pick up small sub-beam divergence position changes characteristic of motion in System A's platform. Therefore, it is preferred to have each System able to rapidly counter motions occurring on its own platform. Either one or both of System A and B could pre-emptively apply counter motion commands to cancel onboard platform motion affecting its own system, that is sensed via onboard motion sensors (e.g., sensors 20 of FIG. 1 like gyros and accelerometers which sense one or more of roll, pitch and yaw movements of the mobile platform).

At operation 218 a "Focus" operation is then initiated which involves having the controller 12 of System A read the phase delay as an orientation misalignment signal, and the amplitude as the scale of misalignment, and to generate an alignment error vector. At operation 220 the controller 12 then uses this alignment error vector to modulate the angle of the beam steering chip to drive the error vector to zero.

If the user is interested in operating the System A in a low visibility mode, then after making a communications connection, the emitter focusing control subsystem 22 (i.e., the transmitter) and the detector focusing control subsystem 24 (i.e., the detector) could be controlled by the controller 12 to switch to utilizing an intermediate node. This mode will shift the two Systems A and B to point at a third party node, perhaps a road sign or rock, and reflect off that, knowing that the other system's detector will be looking there too. This would substantially reduce the power passed between units due to each System A and B incurring likely substantial beam spread losses by having the received signal reflected off an object. But the same diffuse reflection that incurs power losses also hides the receiver and transmitter, as the beam spreading hides the exact direction of both the transmitter and receiver. The intermediate node thus provides a shared communication point without forcing Systems A and B to directly laser illuminate one another.

The benefit of using the beam steering chip 34*b*1 in controlling the receiving micromirror elements 34*b* of the DMM assembly 32 of the CAFSOC system 10 is the increased sensitivity to the incoming signal and the capability to reject signals coming from directions other than where the transmitting micromirror elements 34*a* are pointing at. The directionality makes the resulting communications link especially resilient to jamming efforts, which is of high value for defense applications and congested commercial environments such as autonomous vehicle communications.

The design of the CAFSOC system 10 could be made to cover a full 360° coverage region by arraying paired sets of transmit/receive apertures, each covering a part of the circle, (approximately 60° for the LDA design). Air-to-air network links could operate via arrays of the CAFSOC system 10 placed behind conformal windows around the fuselage of an aircraft. In cases where size is at a premium, such as for infantry or small drones, the CAFSOC system 10 can be mounted on low cost simple rotary platforms inside a softball sized package, or pointed at a small spinning mirror that allows the system to periodically view the full 360 degree surrounding scene. Such rotary platforms can be low-cost, low precision components, as the CAFSOC system 10 can easily compensate for dynamic issues in the platform rotation.

The array nature of the beam steering chips 34*a*1 and 34*b*1 used by the CAFSOC system 10 units means that each CAFSOC system 10 could operate to either send out a single beam or split the beam between multiple targets as desired. The receiver of each CAFSOC system 10 could equally divide its aperture among a single or multiple other units. The single beam could be time shared over many targets if desired. The multiple beam steering chips in a wraparound 360° design would provide another method for connecting to multiple targets in parallel. All of these options enable the CAFSOC system 10 units to operate as multi-connected nodes in an ad hoc network to ensure communications despite node failures or poor weather. A large network of low cost CAFSOC system 10 units driven by high-bandwidth precision beam steering chips offers a new route to break the conventional paradigm of directional versus omnidirectional signal transmissions/receptions, and achieves the best of both types of systems: consistent signal lock with low power in all weather conditions, and with extremely low probability of detection or interception. The low-cost compact nature of the beam steering chip architecture used in the CAFSOC system 10 enables wide deployment, so that the network can rely on many closely located nodes that can penetrate poor weather rather than on a few precious nodes separated by large distances.

The CAFSOC system 10 also compensates for, and cancels out, platform motion of the platform (e.g., vehicle) which it is being used with. By this it is meant that the CAFSOC system 10 can be controlled such that the pointing angle assigned to the emitter array 34*a* accounts for and cancels out motions of the platform, such that the laser default pointing angle remains largely constant as seen in the frame of view of the environment around the platform. It is important that the CAFSOC system 10 be able to maintain the orientation at the acquisition process. The adaptive compensation provided by the CAFSOC system 10 cancels out high frequency issues.

There are at least four major benefits to the CAFSOC technology; i) greater link reliability in rough environmental conditions, ii) reduced laser power demand due to improved beam pointing, iii) order-of-magnitude reduction in size weight and power (SWaP) than the existing mirror technologies, all at significantly lower cost. Compact low-cost LDA-enabled FSOC offers a means to achieve widely deployable reliable, jamming-resistant, stealthy (LPI/LPD) navigation and communications network links; and iv) the use of only one laser for both determining the precise aiming direction needed to communicate with a remote CAFSOC system 10 unit, as well as to pass data and information on to the other CAFSOC system unit.

Greater link reliability in adverse environmental conditions: The large range and high precision enabled by a beam steering chip enable it to hold link even on mobile platforms including vehicles, aircraft, ships and personnel. These conditions include turbulence, shock, acceleration, thermal variation and vibration. The CAFSOC system 10 can thus be widely deployed and trusted to work reliably throughout the full scale of mobile operation whether on the ground, in the air or in space.

Reduced laser power demand due to improved beam pointing: The integral feedback control on the mirrors of the enable them to operate with about 10× less jitter than previous state of the art systems owing to the equivalent increase in control bandwidth. The laser power requirements for communication scales by the square of the jitter, owing to the smearing of the beam over the downstream target. A reduction in jitter will have a significant squared effect on driving down the required laser power, which plays a large role in the SWaP as well as cost of the CAFSOC system 10 unit.

Order-of-magnitude reduction in size weight and power (SWaP): The beam steering chip replaces the steering mirror and gimbal setup used in present state-of-the-art systems with a single mass produced IC-microfabricated chip. This replacement removes the other main driver of SWaP and cost for FSOCs. Beam steering gimbal systems are generally custom assembled, high-mass and low-speed and have significant dynamic issues. The beam steering chips 34a1 and 34b1 replace these with mass-manufactured chip-scale components (or one single component including the capability of both beam steering chips 34a1 and 34b1) which has significantly reduced mass, higher speed, and improved dynamics.

The jitter reduction and gimbal replacement advantages combine to offer a route to achieve low-cost FSOC. Low-cost and small SWaP enables wide deployment. Wide, dense (order 1 km separation) deployment of small FSOC links provides an approach to ensure network reliability even in adverse conditions including poor weather. High performance gimballed FSOC units as developed in specialized programs can cost well above $100 k (dominated by the manually assembled beam steering system), and still place significant restrictions on motion/maneuvering in order to guarantee link reliability. A CAFSOC can replace these with a $10-100 chip that does not restrict maneuverability owing to a 100× increase in bandwidth. The jitter reduction (10×) also drives down laser power demands, allowing for further significant reductions in FSOC cost by shrinking the laser. The combined replacement of gimbal and reduction in jitter can remove the two main drivers of SWaP and cost, providing a means to reach handheld systems with cost on the scale of $10's-$1000's.

Figure 9:
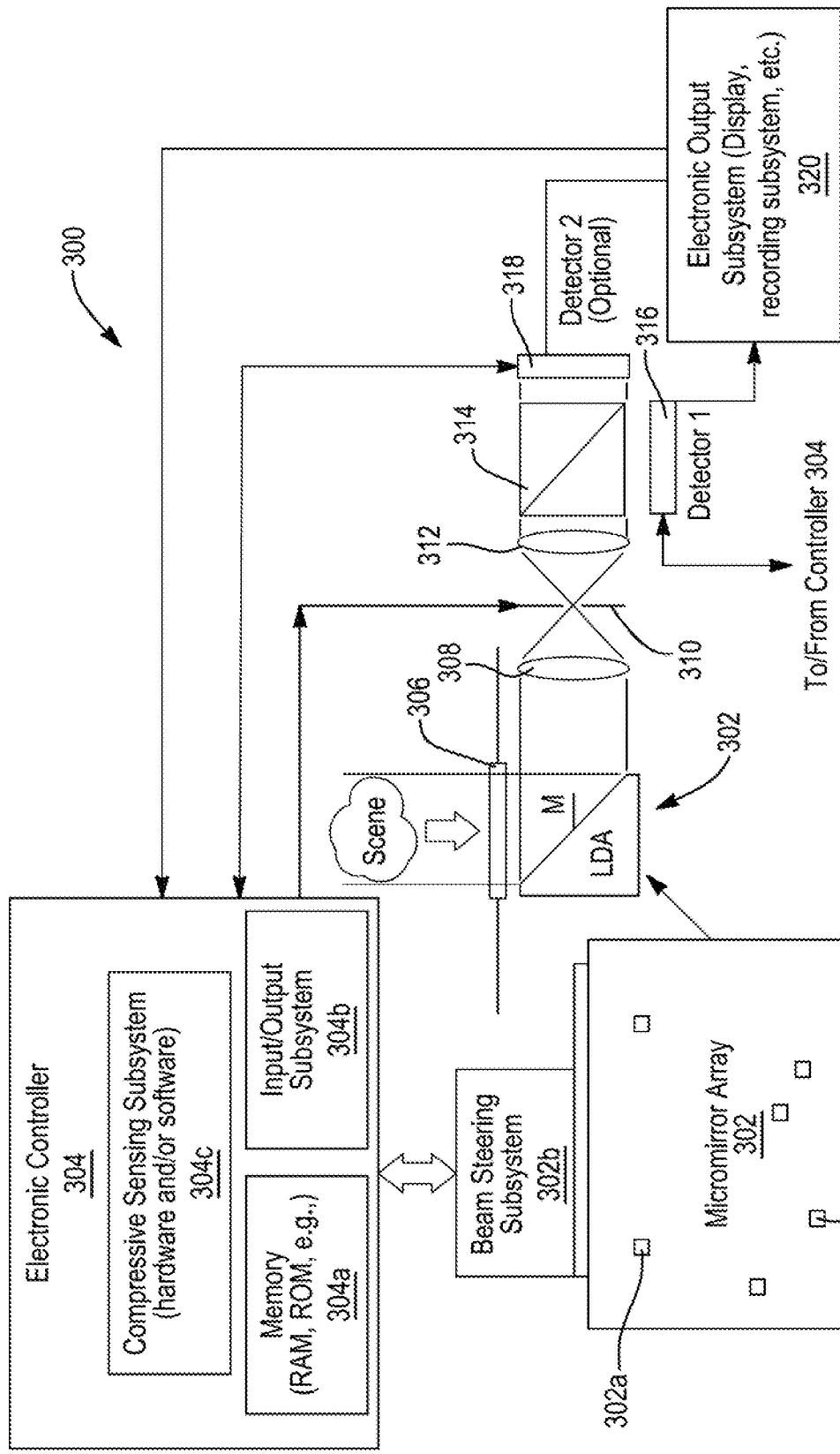
FIG. 9 is a high level block diagram illustration of another embodiment of the present disclosure which forms a real time, compact, adaptive compressive optical sensing system for capturing high resolution, real time areal images.

Referring to FIG. 9, another embodiment of the present disclosure is presented which relates to an adaptive, free space, gimbal-less optical imaging system 300. In summary, the system 300 makes use of certain of the receiver componentry of the system 10 but with important differences in the sensor section. Rather than linking between pairs of equivalent laser communication units, the system 300 adapts the receiver componentry for capturing optical information from a real time image of an object or scene.

In FIG. 9 the system 300 can be seen in this example to include a digital micromirror array 302 having a plurality of independent micromirror elements 302a. The precise plurality of micromirror elements 302a used may vary to meet the needs of a specific application, but it is expected that for many commercial applications, hundreds of micromirror elements 302a will be used to form the micromirror array 302. The micromirror elements 302a can each be independently tilted or tipped (e.g., "steered") to a desired angle in accordance with suitable scanning control signals from an electronic controller 304. A beam steering subsystem (e.g., integrated circuit chip) 302b may be fabricated as an integral portion of the micromirror array 302 for generating micromirror tilt signals in response to the scanning control signals received from the electronic controller 304. In this example the micromirror array 302 may be the Lightfield Directing Array described above, which has been developed by the assignee of the present disclosure.

The controller 304 may include memory 304a (e.g., RAM, ROM, etc.) as well as an input/output subsystem 304b, which applies real time scanning control signals to the micromirror array 302 which the beam steering subsystem can use to determine the needed tilt control signals needed to aim each of the micromirror elements 302a as needed to image a desired scene. The micromirror array 302, with its large angle tip/tilt capability and position sensing incorporated into each micromirror element 302a, provides a means to achieve all necessary performance metrics for providing high resolution areal images, and without the drawbacks attendant to a gimbal-mounted mirror system.

The system 300 of FIG. 9 further may include a window or aperture through which the image can enter the device 306, a first focusing lens 308, an electronically controlled aperture control subsystem 310, and a second focusing lens 312. In one embodiment the aperture control subsystem 310 may comprise an electronically controlled dynamic field stop subsystem, which in this example is identical in construction to the dynamically variable field stop 31c2. Merely for convenience, the following discussion will reference the electronically controlled aperture control subsystem 310 simply as the "dynamic field stop 310". It will be appreciated, however, that MEMS or transmissive media approaches all fundamentally form "dynamic field stops" (i.e., device which modulates the acceptance angle and change the field stop size). A field stop may thus be understood, in a broad sense, as a device or system which sets the limiting aperture defining the angular range of acceptance for viewing, which is what the dynamic field stop 310 operates to do.

The system 300 may also include a beam splitter or optical filter 314 (referred to throughout the following discussion for simplicity as "beam splitter" 314), and at least one detector 316. Optionally, more than one detector may be used, as in the drawings where a second detector 318 is included. If two detectors 316 and 318 used, then the detectors may be arranged to receive two distinct spectral outputs from the beam splitter 314. For example, the outputs generated by the beam splitter 314 may be selected based on predetermined wavelength bands (e.g., 800 nm-900 nm for the detector 316 and 900 nm-1000 nm for the detector 318). The detectors 316 and 318 may each be a single optical sensor (e.g., photodiode) or they may each comprise a plurality of optical sensors, for example a plurality of photodiodes or camera chips (CCD, CMOS, or other FPAs). The detectors 316 and 318 may optionally provide signals to an additional electronic output monitoring subsystem 320, which may comprise a display device (LCD, LED, CRT, etc.) or an electronic recording subsystem for recording electronic (e.g., digital) data collected by the detectors 316 and 320. Optionally, the electronic subsystem 320 may be in communication with the electronic controller 304 to enable the electronic controller to obtain collected data sensed by the detectors 316 and 318.

In operation, the electronic controller 304 of the system 300 supplies control signals to the micromirror array 302 to scan the micromirror array 302 over a desired field. By "scan" it is meant the angle of each one of the micromirror elements 302a is adjusted to different positions over time so that the micromirror array 302 is able to receive light from an scene (i.e., an area which also has depth) being imaged. The commands may be to keep all the micromirror elements 302a in the micromirror array 302 operating synchronously or to have micromirrors 302a receiving different commands from one another so the array points in multiple directions simultaneously. The micromirror array 302 passes the captured light incident upon it through the focusing lens 308 to the dynamic field stop 310. The dynamic field stop 310 controls the acceptance angle of the received light and passes a select subportion of the received light to the focusing lens 312, which it passes it to the beam splitter 314. The beam splitter 314 then passes the light to the detector 316 and optionally to the detector 318.

One or more optical sensors can be used in each detector 316 and 318 to measure the captured light. If one sensor is used, for example in the first detector 316, then the micromirror array 302 will be able to capture one pixel at a time. If multiple sensors are used in the detector 316, then this number can be increased (e.g., two or more pixels worth of light can be captured at a time). The same applies to the light collecting ability of the second detector 318. One preferred mode is to have a sensor array in each detector 316 and 318 that provides one or more sensors per micromirror element 302a. In the case of having one or more sensors per micromirror element 302a, the light passed from each micromirror element 302a can be measured independently via the associated sensors. The independent measurement of the light passed from each micromirror element 302a allows the image collection process to be parallelized where each micromirror element 302a is capturing potentially a different section of the incoming light. Parallelization speeds up the image capture process, but with the tradeoff of reduced aperture and light collection for each pixel.

The system 300 provides the benefit that the micromirror array 302, in combination with control over the dynamic field stop 310, enables the system to be rapidly adapted as needed to maximize sensitivity in low light conditions or image capture rate in higher light conditions. The upper limit of image resolution for explicitly scanned imaging operation is a function of the spatial resolution of the sensing array, as represented by the overall number of sensors used in each detector system 316 and 318, in combination with the discretization of tip/tilt position control and the field stop size (or effective focal width in relation to the field stop).

The operation of the dynamic field stop 310 is important in that it forms an aperture which sets the acceptance angle of light captured and reflected by the micromirror array 302. A small acceptance angle will represent a narrow cone of light rays emanating almost horizontally from an elevational midpoint "M" of the micromirror array 302 in the drawing of FIG. 9, while a large acceptance angle will encompass light rays from a much larger cone emanating from the micromirror array 302 which diverge substantially from the midpoint "M" horizontal axis. Accordingly, as the aperture of the dynamic field stop 310 is reduced, then only light from an ever finer cone of angles off the micromirror array 302 can pass through the dynamic field stop 310 and make it to the sensor(s) of one or the other of the detectors 316 or 318. If the aperture formed by the dynamic field stop 310 is widened, then the acceptance angle for each micromirror element 302a is increased. "Acceptance angle" is defined for each micromirror element 302a as the range of possible angles of incoming light that will reflect off the given micromirror element 302a and still pass through the field stop to be captured by the detector system 316, and optionally also by detector system 318. This sets the angle of light which will contribute to the detector system 316 (and optionally also detector system 318) reading for any given measurement, and thus the effective pixel size during image capture.

In practical applications of the system 300 it may be useful to dynamically change the acceptance angle during operation. For example, it may be helpful to increase the collection angle resulting in rougher images initially during a first scan of a scene, and then refine the pixel resolution and recapture an image only in a subarea of interest of the scene while performing a second scan. The system 300, being an adaptive system, is able to carry out such changes "on the fly" as image information is being scanned and collected.

The above described dynamic field stop 310 widening can be performed in several ways. One option is to use a dynamic field stop as described above for the CAFSOC system 10. This could be generated in the same way as described above for the dynamically variable field stop 31c2 discussed above. Alternatively, a MEMS shutter system or a variably controlled transmissive media could form the needed design. The MEMS shutter system could work in a reflective mode, where the focused beam is bounced off a small array of reflective mirrors. In this case, the array should be made with the smallest pitch possible, like the Texas Instruments DMD design which has approximately 10 µm pitch. When the mirrors are flipped to one orientation then the light will reflect off the MEMS shutter and pass to the detector. But when the mirrors are flipped to another orientation, the light is rejected and does not reach the detector. The MEMS shutter array could then change the effective size of the aperture dynamically by flipping mirrors to determine the shape and extent of the field stop. Alternately a controlled transmissive media approach would work by using an optical element which would have an array of transmissive pixels whose transmissivity could be controllably changed, like a liquid crystal display. Such a device would be put at the plane of the focused beam (i.e., at the plane of the dynamic field stop 310 shown in FIG. 9), then the transmissivity adjusted dynamically to form a transmissive field stop of the desired shape and extent. Still another option is a dynamic curvature approach that uses a reflective optical surface or variable optical phased array which can control its curvature (or effective curvature) to set a focal length that could be placed at a conjugate plane to the micromirror array 302. When curvature is applied to the dynamic focal length device, it changes and widens the angle of acceptance for each micromirror element 302a of the micromirror array 302, essentially adding a varying tip/tilt offset to each micromirror element 302a. This can be visualized by imagining superimposing the curvature of the dynamic focal length device onto the micromirror elements. Such superposition is a useful approximation since the elements are in conjugate planes and so appear to stack their effects. The curvature of the dynamic focal length device within each micromirror element would make the element appear to have a 'fish-eye' like lens and widen the acceptance angle. The tip/tilt angle of the dynamic focal length device at the center of each micromirror element can be interpreted as a tip/tilt offset to the mirror orientation. The tip/tilt offset effect could be removed by suitable adjustment of the orientation for each micromirror element, leaving only the acceptance angle widening effect. This widens the area of light capture for the whole array, but reduces the effective aperture for any given angle. So the system 300 with a dynamic curvature approach can scan a larger area, but at lower sensitivity to light owing to the reduced effective aperture. Comparatively, the dynamic field stop approach retains the full effective aperture width even while increasing the angle of acceptance. This means that the dynamic field stop approach retains maximum light sensitivity.

Still further, instead of having an additional dedicated focal control device, a tip/tilt/piston bias that provides an effective focus offset can be placed on each of the microelements 302a within the array to widen the field of regard. In this case, the micromirror array elements now each point in slightly different directions from one another. Instead of steering all to the same angle, they are distributed to cover many different angles. This is the equivalent of putting a discretized 'cuvature' onto the mirror. Rather than acting like a flat steering mirror, the micromirror array surface is now given a slight curvature and will then capture light from a wide range of angles. This is similar to the dynamic curvature approach but adds the focus function to the micromirror array 302, potentially with some compromise to individual element dynamic range but with the added benefit of a simpler integrated system. In all cases, the system 300 will be able to capture a larger solid angle, and thus scan an area or scene more rapidly.

It is expected that compressive sensing techniques may be employed with the system 300. Thus, the system 300 may also optionally include a compressive sensing subsystem (hardware and software) 304c, as shown in FIG. 9. The compressive sensing subsystem 304c may be included as a component of the electronic controller 304 or optionally may form a fully separate subsystem which communicates with the electronic controller 304. The compressive sensing subsystem 304c uses a limited sampling of the image (i.e., scene) of interest, meaning pixels from throughout the image. Compressive sensing algorithms included in the compressive sensing subsystem 304c can then be used to regenerate a rough estimate of the image from the information provided by the selected pixels. The number of pixels used (i.e., subset of all the available pixels) can be upwards of an order of magnitude less than the full number of samples. This allows for images to be generated well before all of the image area is sampled. This technique thus trades resolution for speed in the imaging process. The system 300 and its micromirror array 302 is well suited to this approach as the array and detectors can be used to rapidly and controllably capture a subset of pixels from the full image in arbitrary order. This subset of pixels collected information from the limited number of micromirror elements 302a used is then fed into a suitable compressive sensing algorithm and used to generate rough low resolution images. The compressive sensing subsystem 304c may include its own embedded logic, for example a dedicated microprocessor, field-programmable gate array, or application specific integrated circuit, which adds some latency and complexity, but the savings afforded in scanning timelines compared to an explicitly steered approach can be substantial. The user or additional image processing algorithms built into the embedded logic can be used to identify areas of interest within the imagery. The adaptive micromirror array 302 can be focused on these areas of interest by the electronic controller 302 (or optionally by the compressive sensing subsystem 304c) and repeat the sensing image capture but this time at higher resolution if operating in an explicitly controlled mode. The resolution of the image is ultimately set by the micromirror 302a angular resolution and the dynamic field stop 310, not pixel pitch as is typical for digital cameras. Because of this feature, the system 300 can zoom and focus on a small subportion of interest of a much larger scene.

When using compressive sampling, the sampling of points can be either random or pseudorandom. Pseudo-random sampling can more rapidly build up the image by ensuring a good distribution over the image. Random sampling is slower to build up an image, but can be achieved by random motion of each micromirror element 302a in the micromirror array 302. The exact angle of the micromirrors 302a must be known via position sensing on each micromirror element 302a. If the angle is known, it can be varied nearly randomly to sample over the full image, then compressive algorithms can be used to slowly recreate the image. This allows for possibly uncontrolled motion at the micromirror elements 302a to be used to create the image. In such a case, the micromirror elements 302a do not need to be operating in a closed loop configuration to reject disturbances and random motions; disturbances and random motions are acceptable from a compressive imaging perspective.

The system 300 enables compact image sensing with a large effective aperture that can operate stably in high mechanical noise environments. For explicitly steered systems, the use of the micromirror array 302 enables individual, closed-loop tip/tilt control of each micromirror element 302a, which in turn enables full spatial sampling of a two-dimensional space. The system 300, which thus provides an explicitly steered system, also potentially allows for a higher fidelity imaging mode within a specific portion of the entire effective field-of-view of the sensor. For systems intended to operate via a compressive sensing approach, the micromirror elements 302a in the array 302 do not require individual control and can instead be agitated in aggregate using platform vibration or in-situ vibration devices (e.g., piezo-disks). The compressive sensing system approach thus significantly reduces the complexity and cost of the micromirror array design at the expense of the post-processing required to generate imagery from a sparse frequency data set, and the inability to operate in a high fidelity mode.

Figure 10:
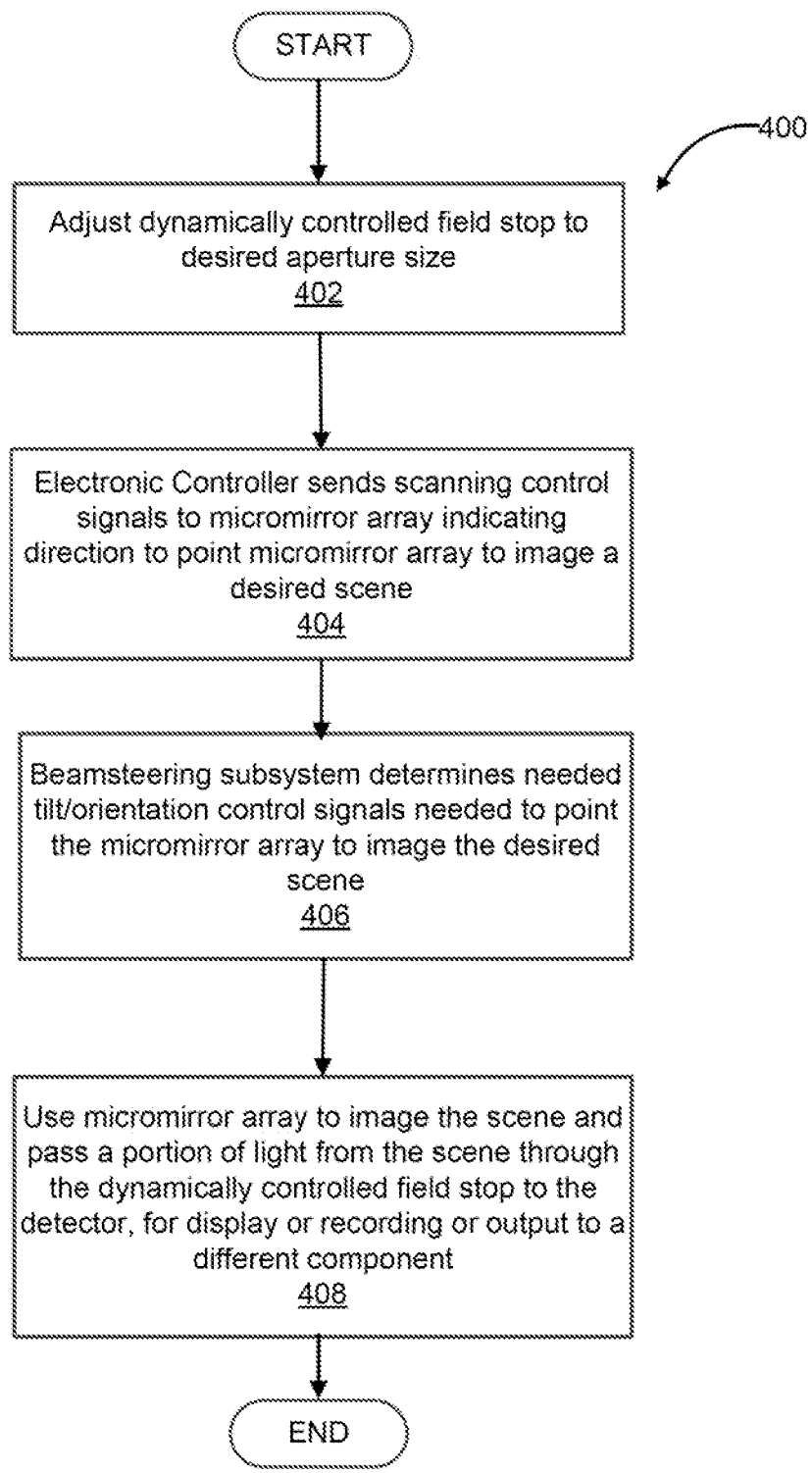
FIG. 10 is a high level flowchart of one example of various operations that may be performed by the system of FIG. 9.

Referring briefly to FIG. 10, a flowchart 400 shows one example of various operations that may be performed by the system 300. At operation 402 the dynamically controlled field stop 310 may be adjusted to a desired aperture size. At operation 404 the electronic controller 304 may send scanning control signals to the micromirror array 302 which indicated a desired pointing direction that the micromirror array 302 is to point to in order to image a desired scene. At operation 406 the beam steering subsystem 302b determines the needed degree and orientation of tilt to be applied to each of the micromirror elements 302a of the micromirror array 302 to be able to image the desired scene. At operation 408 the micromirror array 302 images the scene and a subportion of the light from the scene passes through the dynamic field stop 310 to the detector 316 where it is either displayed on the electronic output subsystem 320, or recorded, or passed back to the electronic controller 304 or to a different electronic component or subsystem.

The system 300 thus enables light from a scene to be captured either through an explicit scanning methodology, for example raster scanning, similar to traditional mosaic composite imagery, or via a compressive sensing approach where data is collected in a pseudorandom fashion. The system 300 provides a robust means to provide gimbal-less imaging even in high mechanical noise environments, and yet still meets SWaP constraints for many challenging implementations.

The system 300 is expected to find utility in a wide range of applications where it is important to detect and pinpoint, in real time, light within a scene being imaged, and to identify spectral information pertaining to the light collected from a scene. A compressive multi-spectral solid-state imaging system can be useful as a sensor in autonomous vehicles to better understand their surroundings by seeing through poor weather or ensuring returns off low-reflectivity objects. This system does not replace cameras but rather supplements them to ensure image capture can be carried out in conditions where cameras would have difficulty operating, such as on bumpy roads. Such challenging implementations may include one or more of assisting in drone navigation or other autonomous system environmental mapping or sensing operations.

Figure 11:
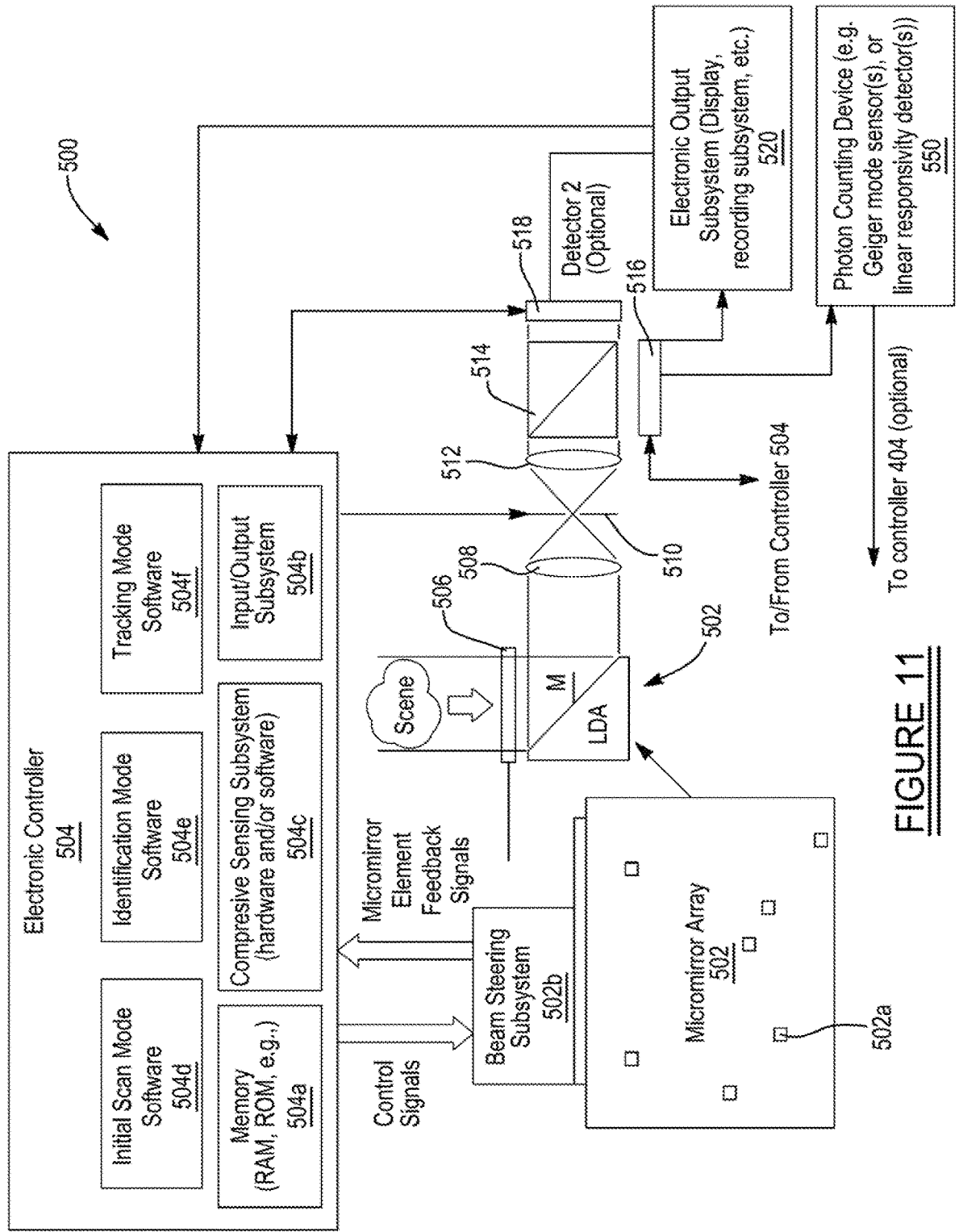
FIG. 11 is a high level block diagram illustration of another embodiment of the present disclosure which is adapted for identifying optical signals sources (i.e., not just laser light sources) within an environmental scene.

Referring to FIG. 11, a system 500 in accordance with another embodiment of the present disclosure is illustrated. The system 500 is similar to the system 300 in construction, and components in common with those of the system 300 have been designated in FIG. 11 using reference numbers increased by 200 over those used in FIG. 9. The system 500 shown in FIG. 9 may further include a photon counting device 550, which may comprise one or more Geiger mode sensors or one or more responsivity detectors, which provide a sensitivity sufficient to capture any trace of light, the benefits of which will be explained further in the following paragraphs. The controller 504 may include memory (e.g., RAM/ROM) 504a, an input/output subsystem 504b for communicating either by wired or wireless means with external components, and a compressive sensing subsystem 504c. Software modules may include an initial scan mode software module 504d for helping to perform an initial scan of a scene, an identification mode software module 504e for performing more detailed scanning of a specific subregion of a scene to help identify specific objects of interest in the scene, and a tracking mode software module 504f for tracking identified objects of interest in the scene once such objects are identified.

The use of the advanced reflective micromirror array 502 with position feedback of its micromirror elements 502a provides a means to achieve all three modes (i.e., initial scene scanning, object of interest identification and object tracking) with the same hardware simply operating in different modes. The use of the micromirror array 502 and its beam steering subsystem 502b enables a collision avoidance system to be constructed in a dramatically more compact package. The micromirror array 502 is able to support all three of the important operating modes (i.e., initial scene scanning, object identification and tracking) using the same integrated chip (i.e., the integrated circuit chip used to form the beam steering subsystem 502b). The micromirror array 502, with its feedback control capability, provides a means to achieve stable pointing, and thus optical sensing, even in high mechanical noise environments (e.g., when mounted on a moving platform such as a land vehicle, airborne platform or sear-borne platform).

The system 500 is expected to find significant use and utility on various forms of vehicles, for example and without limitation, on aircraft, on unmanned airborne drones, and on airborne rotorcraft, and on manned and unmanned vehicles to identify other vehicles and/or objects of interest in their vicinity. An important benefit of the system 500 is its highly compact size. Being a solid state system, the system 500 forms a small, relatively light weight, relatively inexpensive and robust system for operation in high mechanical noise environments. And since the system 500 may form a passive sensor, it does not need to draw significant power for its operation. Because of the multispectral identification capability that the system 500 provides, it has the ability to reject false signals and ensure that only valid objects are tracked. This particularly feature is ideal for drones, which cannot support large, power hungry or fragile sensors. The use of a system 500 having a compact, highly power efficient sensor is also expected to find utility in use with small satellites, which must find the other members of the constellation that might be a good distance off or in different orbits, meaning that the satellites may have high relative speeds to one another. The system 500 is also expected to find utility in use on satellites as a collision avoidance system for avoiding space debris, which is presently growing concern among space agencies around the world. The system 500 is also expected to find utility in forming tracking beacons, as might be placed on landing spots or on other drones in a swarm of drones, or even generated by a steered laser point. The collection of angle information via the position sensing of the micromirror elements 502a of the micromirror array 502 is an important difference between the system 500 and a traditional camera. The system 500 is superior to cameras because of its adaptability. The system 500 may use the segmented micromirror array 502 to operate with a similarly large aperture for light collection but then have the advantage of the best possible (i.e., high resolution) sensor, scanned over the surface. This high quality photo-detection may be paired with high resolution angle information provided via sensing in the micromirror elements 502a. Finally, the image capture and scan area could be scaled down to focus on small areas of an environmental scene and provide higher update rates than cameras, since the micromirror array 502 only needs to draw on a small number of micromirror elements 502a (e.g., representing down to even just 1 pixel). Cameras struggle with sensitivity and refresh rate owing to the need to simultaneously operate many pixels, most of which capture no valuable information. Secondly, their resolution is limited by pixel pitch, whereas the proposed sensor resolution is set by micromirror motion resolution and the field stop size, both of which can be pushed to very fine resolution. Telescopic imaging systems can refine the resolution but then run into issues with trying to perform scanning via a gimbal. On highly mobile platforms, camera-based image capture is often degraded or made unusable by the platform motion. This drives demand for a gimbal which further complicates the situation. A solid-state beam steering solution, which the system 500 provides, is ideally situated to operate in this high noise environment and provide the same object acquisition, identification and tracking capability.

In operation the system 500 operates in part by using the receive side optical design of the CAFSOC system 10 described above. The scanning and Lock-in tracking may be the same as described for the CAFSOC system 10 in its optical communications operation, as covered in detail in connection with FIGS. 4 and 5a through 8d. This means the system 500 first carries out scanning over a wide area, using the initial scan mode software 504d (i.e., similar or identical to the operations shown in flowchart 100 of FIG. 3), to try to detect the optical source in the environmental scene. The goal of the scan is to provide refinement in the location of the optical source. The system 500 can trade off scanning rate for resolution by scanning the field of view more slowly with a small field stop, or more rapidly covering the full field of view using an enlarged field stop. The small field stop approach provides a refined measurement of optical source location with less uncertainty, but it also is likely to require a longer scan before picking up the optical source. The wider field stop approach can be used to more quickly cover the field of view but does so with a larger uncertainty of actual optical source location. This field stop widening can be done in several ways, with one such way being the use of the dynamic field stop 510 of FIG. 11 (which may be identical in construction to the dynamic field stop 310). Alternatively a MEMS shutter system could be used to provide the needed field stop control. As another alternative, a tip/tilt bias can also be placed on the micromirror elements 502a within the micromirror array 502 to widen the field of regard. As another alternative, an optical surface which can control its curvature to set focal length could be placed at a conjugate plane to the micromirror array 502. When curvature is applied to the dynamic focal length device, it changes the angle of acceptance for each micromirror element 502*a*, essentially adding a tip/tilt offset to each micromirror element that differs from the others. Instead of the full array micromirror array 502 now looking in one direction, each micromirror element 502*a* is looking in a slightly different direction. This widens the angle of acceptance of light capture for each mirror, but reduces the effective aperture for any given angle. So the system 500 can sense light over a larger area for pointing at a given angle, but is less sensitive. Comparatively, the dynamic field stop 510 operation widens the angle of acceptance without loss in aperture size for any angle, so it retains sensitivity. In both cases, the system 500 can now accept light over a larger range of angles and thus scan an area more rapidly. In the acquisition mode, the detectors 516 and 518 are preferably run in the highest optical sensitivity mode in order to find the small signal of interest during the scan. While the angle of acceptance for the mirrors may be increased by the various methods laid out above during scanning, the photosensitivity may need to be tuned up to catch any traces of the signal of interest. This can be done using the photon counting device 550 of FIG. 11 to implement photon counting, for example with Geiger mode sensors. Geiger mode sensors are well suited to read a very small optical signal at particular wavelengths. The acquisition process, in one embodiment, operates by looking for signals with particular spectral signatures, then photon counting provides high sensitivity during the acquisition step. This allows the detectors 516 and 518 to readily determine when some, or all, of the micromirror elements 502*a* have scanned over one or more objects of interest.

Once an object, or possibly several objects, is/are found in the scan, the system 500 shifts to identification mode and begins using the identification mode software 504*e*. In this mode, part or all of the micromirror elements 502*a* of the micromirror array 502 is/are adjusted to point at the object of interest which has been revealed. The light is passed through the optics 508, 510 and 512 shown in the system 500. The array before the grid of sensors is designed to determine where all incoming light is routed. However, this is not necessary. In the simplest design, only a single pixel sensor may be required for the detector 16 or 18, and the intensity capture comprises the full signal. In another, more complex embodiment of the detector 16 or 18, multiple optical sensors (e.g., photodiodes) may be placed in an array and could be scaled up so there is approximately a sensor (or many pixels) for each micromirror element 502*a*. With such an embodiment, the array of sensors are able to determine the light from each micromirror element 502*a*, which will further speed up the acquisition process since each micromirror element 502*a* can now be treated as an independent scanner. In a highly complex design, the light routing array (as shown in the CAFSOC 10 design) may be used, which allows the system 500 to determine how to route all the incoming light. The system 500 could be controlled so that all the light received may be routed light to a single sensor pixel (highest signal, least noise), thus sending the light from any given micromirror element 502*a* or set of micromirror elements 502*a* to a single sensor pixel of the detector 516 or 518. The system 500 could dynamically switch from this high sensitivity mode to a rapid scan mode where sections of the aperture are routed to different sensing elements, thus parallelizing the scanning operation. For instance, each micromirror element 502*a* in the micromirror array 502 could be routed to an independent sensor (or more than one) and so can carry out the maximum number of independent scanning operations in parallel. The design would differ from the CAFSOC 10 in the sensors used in the detector 16 or 18.

For identification purposes, the spectrum of the object of interest is likely to provide significant value. So the system 500 may make use of an optional chromatic splitter to separate out parts of the incoming light spectrum, and then channel the incoming light through suitable filters and pass one or more selected subportions of the light to photosensitive elements of the detector 516 or 518. This would allow for simple real-time multi-spectral measurements of the object of interest. This could be anywhere from a non-spectral measurement up to several spectral bands being simultaneously measured by the system 500. The spectral measurement could provide the identification queue for the sensor to decide which objects are worth tracking.

In the tracking mode, the system 500 may use the tracking mode software 504*f* (i.e., similar or identical to the operations of FIG. 4*b*) and may operate in the same, or a similar, way as noted in for the CAFSOC 10. It may use a rotating lock on to spin the incoming light around the dynamic field stop 510, as described in connection in the flowchart 200 of FIG. 4*a*. When perfectly aligned, the received light intensity would have essentially no, or negligible, intensity variation to it. But when misaligned, the beat amplitude and phase would determine the vector of alignment error. In this mode, the sensors of the detector 16 (or both of detectors 16 and 18) would ideally be run in a linear rather than photon counting mode or Geiger mode. The photon counting mode or Geiger mode, however, provides a less than optimal means to determine the intensity as it very quickly saturates. The photon counting mode or Geiger mode is ideal for small scale detection as would be used for initial detection, but as the signal grows (full aperture focus on the object), it can quickly saturate the fine sensitivity mode that the photon counting mode or the Geiger mode provides. In that case, linear responsivity detectors should be used. These will provide a signal proportional to the incident intensity, which is the ideal signal needed for the rotating lock-on mode. A single segmented tracker could potentially track more than one object at a given time by splitting the aperture to focus on the multiple targets and routing the light from each target back to a dedicated sensor.

Figure 12:
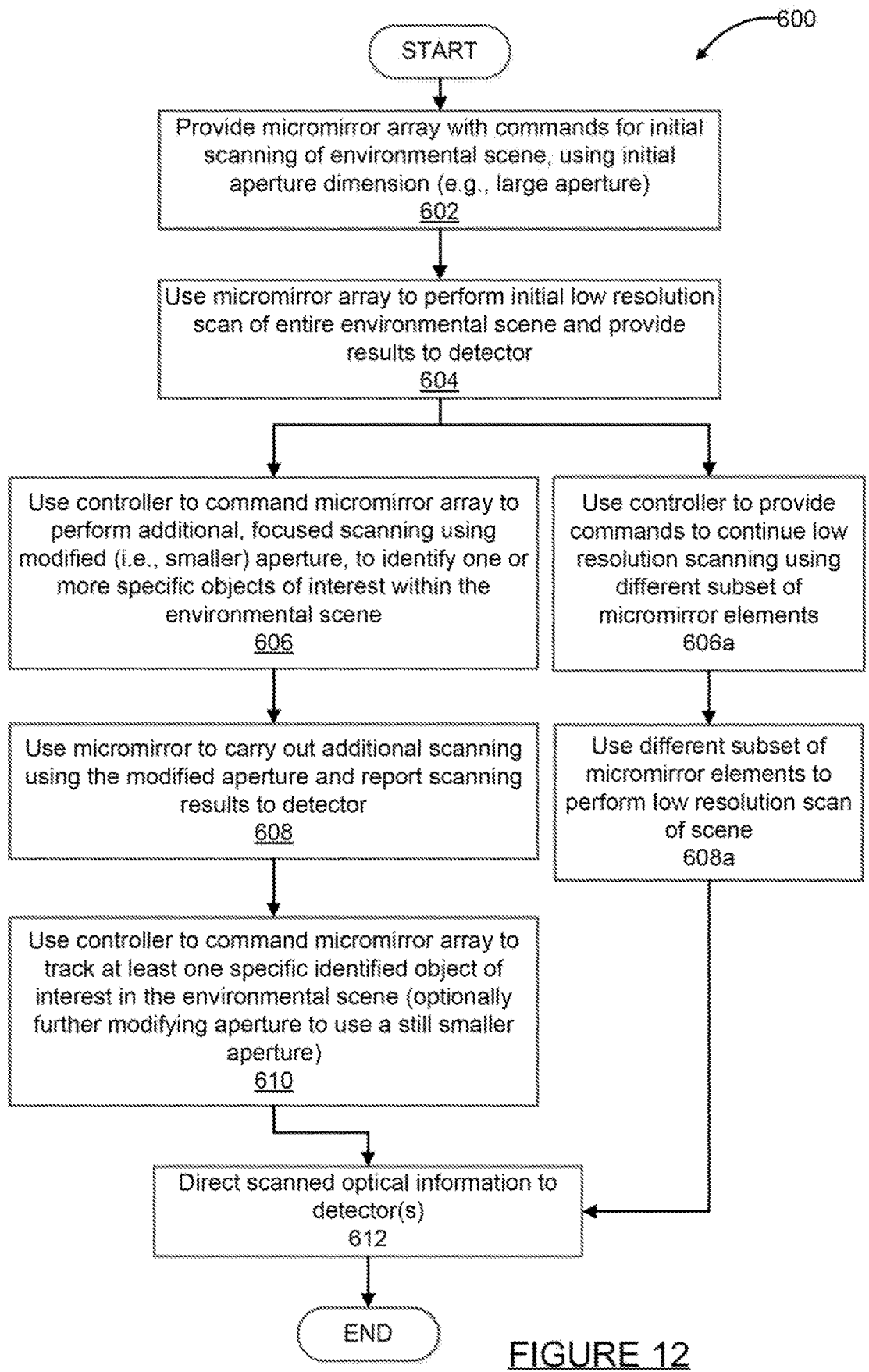
FIG. 12 is a high level flowchart illustrating one example of an operational sequence that the system of FIG. 11 may be used to carry out to implement two different types of scanning operations virtually simultaneously.

FIG. 12 shows a flowchart 600 which sets forth one example of operations that the system 500 may perform during use. Initially at operation 602 the electronic controller 504 provides the beam steering subsystem 502*b* of the micromirror array 502 with commands for initially scanning an environmental scene, for example using an initial (e.g., large) aperture setting. At operation 604 the micromirror array 502 performs the initial scanning, which typically is a low resolution scan, but covers a substantial portion, or the entirety of the environmental scene. At operation 606 the electronic controller 504 commands the micromirror array 502 to perform additional, focused scanning using a modified aperture. The modified aperture will typically be a smaller aperture which enables a higher resolution scan, but of a much more limited subregion of the environmental scene. This operation is carried out to identify one or more objects that were initially recognized in low resolution scene, but because of the limited resolution of the initial low resolution scan could not be identified as being specific objects of interest. Substantially simultaneously at operation 606*a*, the electronic controller 504 provides commands to the beam steering subsystem 502*b* to continue low resolution scanning of a larger section of the environmental scene but using a different subplurality of micromirror elements 502a that what are being used for the low resolution scanning. Thus, both low resolution scanning and higher resolution scanning are performed virtually simultaneously at operations 608 and 608a by using different subpluralities of the micromirror elements 502a.

At operation 610, the electronic controller 504 may command the beam steering subsystem 502b of the micromirror array 502 to begin tracking one or more specific object(s) of interest that has been determined from the information obtained at operation 608. Optical signal information collected during tracking of the object of interest is supplied to the detector(s) 516 at operation 612, while the micromirror array 502 also supplies collected optical signal information to the detector 612 pursuant to the low resolution scanning mode executed at operation 608a. Again, FIG. 12 is meant to illustrate just one example of how the system 500 can be used to perform two different modes of operation virtually simultaneously. In practice, the system 500 be switching from one mode to another rapidly as the environmental scene changes and various objects enter the scene and/or leave the scene.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An adaptive, free-space optical system comprising:
   a controller;
   a digital micromirror (DMM) array responsive to the controller and including:
      a plurality of independently controllable micromirror elements forming a receiver for receiving optical signals from an environmental scene;
      at least two of the plurality of independently controllable micromirror elements being steerable in different directions to receive optical signals emanating from two or more locations within the environmental scene;
      a beam steering subsystem in communication with the controller, and configured to receive control signals from the controller and to control steering of the plurality of independently controllable micromirror elements;
   a detector configured to receive an incoming free space optical signal imaged by at least one of the micromirror elements; and
   a dynamic field stop interposed between the digital micromirror array and the detector for forming an electronically controllable aperture to control an angle of acceptance of light from the free space optical signal which is able to irradiate the detector.

2. The system of claim 1, further comprising:
   a beam splitter disposed to receive at least a portion of the free space optical signal reflected by the digital micromirror array; and an additional detector, the detector being used to receive a first component of the incoming free space optical signal and the additional detector used to receive a second component of the incoming free space optical signal.

3. The system of claim 1, further comprising a photon counting device responsive to the detector for counting photons received by the detector.

4. The system of claim 3, wherein the photon counting device comprises a Geiger mode counter.

5. The system of claim 3, wherein the photon counting device comprises a responsivity detector.

6. The system of claim 1, further comprising an electronic output subsystem responsive to the detector for at least one of:
recording an output of the detector; and
displaying an output of the detector.

7. The system of claim 1, wherein the system includes an initial scan mode software module for communicating with the beam steering subsystem to control the digital micromirror array to initially scan at least a substantial portion of the environment scene.

8. The system of claim 1, wherein the system includes an identification mode software module for communicating with the beam steering subsystem to control the digital micromirror array to use at least a subplurality of the micromirror elements to reflect light from one or more specific subregions of the environmental scene.

9. The system of claim 1, wherein the system includes a tracking mode software module for tracking a specific optical signal emanating from the environmental scene, and forming a subportion of the free space incoming optical signal being received by the digital micromirror array.

10. The system of claim 1, wherein the electronic controller is configured to control the dynamic field stop to use a first aperture to initially enable rapid scanning of the environmental scene with a first degree of sensitivity, and then to use a second aperture which differs from the first aperture to provide a second degree of sensitivity to light reflected by the digital micromirror array which is greater than the first degree of sensitivity.

11. An adaptive, free-space optical system comprising:
an electronic controller;
a digital micromirror (DMM) array responsive to commands from the electronic controller and including:
a plurality of independently controllable micromirror elements forming a receiver for receiving optical signals from an environmental scene;
at least two of the plurality of independently controllable micromirror elements being steerable in different directions to receive optical signals emanating from two or more distinct locations within the environmental scene;
a beam steering subsystem forming an integrated circuit and responsive to the electronic controller, for implementing first and second different scanning modes commanded by the electronic controller simultaneously, the first and second scanning modes using different subpluralities of the micromirror elements;
a detector configured to receive an incoming free space optical signal imaged by at least one of the micromirror elements; and
wherein the first scanning mode comprises a first resolution, and wherein the second scanning mode comprises a second resolution which is greater than the first resolution.

12. The system of claim 11, further comprising an electronically controlled dynamic field stop for receiving optical signals from the digital micromirror array, and which control an angle of acceptance of the optical signals being viewed by the system.

13. The system of claim 11, wherein the detector comprises a photon counting device.

14. The system of claim 12, further comprising an electronic output subsystem responsive to the detector and forming at least one of:
a display device for displaying information pertaining to optical signals imaged by the digital micromirror array; and
a recording subsystem for recording information pertaining to optical signals imaged by the digital micromirror array.

15. The system of claim 14, wherein the recording subsystem records information pertaining to a spectral feature of the optical signal detected by the detector.

16. A method for imaging an environmental scene, comprising:
providing a controller;
using a digital micromirror (DMM) array responsive to the controller to receive optical signals emanating from the environmental scene;
further using a plurality of independently controllable micromirror elements of the digital micromirror array to receive the optical signals from the environmental scene;
further steering at least two of the plurality of independently controllable micromirror elements of the digital micromirror array in different directions to receive optical signals emanating from two or more locations within the environmental scene;
using a detector for receiving optical signals reflected by the at least two of the micromirror elements; and
further operating the at least two of the plurality of independently controllable micromirror elements of the digital micromirror array in first and second operating modes to simultaneously provide first and second differing operating characteristics for first and second different subregions, respectively, of the environmental scene.

17. The method of claim 16, wherein:
the first operating characteristic of the first operating mode comprises a first scanning resolution and covers a first subregion of the environmental scene;
the second operating characteristic of the second operating mode comprises a second scanning resolution and covers a second subregion of the environmental scene; and
wherein the second scanning resolution differs from the first scanning resolution; and
wherein the second subregion is a smaller area subregion than the first subregion.

18. The method of claim 16, further comprising using an electronically controlled, dynamic field stop disposed between the detector and the digital micromirror to control an area being viewed.

19. A method for imaging an environmental scene, comprising:
providing a controller;
using a digital micromirror (DMM) array responsive to the controller to receive optical signals emanating from the environmental scene;

further using a plurality of independently controllable micromirror elements of the digital micromirror array to receive the optical signals from the environmental scene;

further steering at least two of the plurality of independently controllable micromirror elements of the digital micromirror array in different directions to receive free space optical signals emanating from two or more different locations within the environmental scene;

using a dynamic field stop interposed between the digital micromirror array and a detector for forming an electronically controllable aperture to control an angle of acceptance of light from the free space optical signals which are able to irradiate the detector; and using the detector to receive the free space optical signals which have passed through the dynamic field stop and which have been reflected by the at least two of the micromirror elements.

\* \* \* \* \*